United States Patent
Novak et al.

(10) Patent No.: US 9,635,657 B2
(45) Date of Patent: Apr. 25, 2017

(54) RESOURCE SCHEDULING IN DIRECT DEVICE TO DEVICE COMMUNICATIONS SYSTEMS

(71) Applicant: BlackBerry Limited, Waterloo (CA)

(72) Inventors: Robert Novak, Stittsville (CA); William Anthony Gage, Kanata (CA); Biswaroop Mukherjee, Stittsville (CA)

(73) Assignee: BlackBerry Limited, Waterloo, Ontario (CA)

(*) Notice: Subject to any disclaimer, the term of this patent is extended or adjusted under 35 U.S.C. 154(b) by 391 days.

(21) Appl. No.: 13/725,174

(22) Filed: Dec. 21, 2012

(65) Prior Publication Data

US 2014/0177540 A1    Jun. 26, 2014

(51) Int. Cl.
*H04W 28/02* (2009.01)
*H04W 72/04* (2009.01)

(52) U.S. Cl.
CPC ............................... *H04W 72/042* (2013.01)

(58) Field of Classification Search
CPC ... H04B 7/0417; H04B 7/0623; H04L 1/1621; H04L 1/1628; H04L 12/4679; H04L 61/308; H04L 61/3085
See application file for complete search history.

(56) References Cited

U.S. PATENT DOCUMENTS

| | | | |
|---|---|---|---|
| 2009/0287976 A1 | 11/2009 | Wang et al. | |
| 2010/0009675 A1 | 1/2010 | Wijting et al. | |
| 2010/0106517 A1 | 4/2010 | Kociubinski et al. | |
| 2010/0260156 A1* | 10/2010 | Lee .................. | H04W 56/0035 370/336 |
| 2010/0261469 A1 | 10/2010 | Ribeiro et al. | |
| 2010/0322135 A1* | 12/2010 | Van Lieshout ..... | H04W 72/005 370/312 |
| 2011/0082939 A1 | 4/2011 | Montemurro | |
| 2011/0103317 A1 | 5/2011 | Ribeiro et al. | |
| 2011/0159799 A1 | 6/2011 | Chen et al. | |

(Continued)

FOREIGN PATENT DOCUMENTS

| | | |
|---|---|---|
| CA | 2827866 | 8/2012 |
| CA | 2828074 | 8/2012 |

(Continued)

OTHER PUBLICATIONS

3GPP TS 36.321 v8.2.0; "LTE; Evolved Universal Terrestrial Radio Access (E-UTRA); Medium Access Control (MAC) Protocol Specification (Release 8)"; Nov. 2008; 35 pages.

(Continued)

*Primary Examiner* — Andrew Chriss
*Assistant Examiner* — Romani Ohri
(74) *Attorney, Agent, or Firm* — Fish & Richardson P.C.

(57) ABSTRACT

Methods, systems, and apparatuses of a wireless communications network can involve transmitting, to a first user equipment (UE), configuration information for the first UE (UE1 configuration information) for an inter-device session (IDS) between the first UE and a second UE. The UE1 configuration information may include a first IDS radio network temporary identifier (IDS-RNTI). A radio resource control (RRC) message indicating a resource allocation can be transmitted to the first UE for the first UE to communicate directly with the second UE.

25 Claims, 11 Drawing Sheets

(56) References Cited

U.S. PATENT DOCUMENTS

| | | | |
|---|---|---|---|
| 2011/0194477 A1* | 8/2011 | Damnjanovic | H04W 72/005 370/312 |
| 2011/0223953 A1* | 9/2011 | Lee | H04W 76/023 455/509 |
| 2011/0268006 A1 | 11/2011 | Koskela et al. | |
| 2012/0015607 A1* | 1/2012 | Koskela | H04W 76/023 455/62 |
| 2012/0083283 A1 | 4/2012 | Phan | |
| 2012/0093098 A1 | 4/2012 | Charbit et al. | |
| 2012/0106517 A1 | 5/2012 | Charbit et al. | |
| 2012/0113904 A1 | 5/2012 | Anderson | |
| 2012/0163235 A1 | 6/2012 | Ho et al. | |
| 2012/0207100 A1 | 8/2012 | Hakola et al. | |
| 2012/0258706 A1 | 10/2012 | Yu et al. | |
| 2012/0265818 A1 | 10/2012 | Van Phan et al. | |
| 2012/0275322 A1 | 11/2012 | Ji et al. | |
| 2012/0294163 A1* | 11/2012 | Turtinen et al. | 370/252 |
| 2012/0294199 A1 | 11/2012 | Anchan | |
| 2012/0302239 A1 | 11/2012 | Hu et al. | |
| 2012/0314600 A1* | 12/2012 | Zeira | H04W 52/16 370/252 |
| 2013/0003678 A1 | 1/2013 | Quan et al. | |
| 2013/0114425 A1 | 5/2013 | Sayana et al. | |
| 2013/0150061 A1* | 6/2013 | Shin | H04W 4/005 455/450 |
| 2013/0223352 A1* | 8/2013 | Sartori | H04W 76/023 370/329 |
| 2013/0223356 A1* | 8/2013 | Khoshnevis | H04W 72/042 370/329 |
| 2013/0242770 A1 | 9/2013 | Chen et al. | |
| 2013/0308551 A1 | 11/2013 | Madan et al. | |
| 2013/0322413 A1* | 12/2013 | Pelletier | H04W 72/1289 370/336 |
| 2013/0324182 A1* | 12/2013 | Deng et al. | 455/522 |
| 2014/0003262 A1* | 1/2014 | He | H04W 28/08 370/252 |
| 2014/0018010 A1* | 1/2014 | Gao | H04W 76/023 455/67.13 |
| 2014/0023008 A1 | 1/2014 | Ahn | |
| 2014/0038653 A1* | 2/2014 | Mildh | H04W 28/048 455/501 |
| 2014/0040488 A1 | 2/2014 | Small et al. | |
| 2014/0092829 A1 | 4/2014 | Han et al. | |
| 2014/0119207 A1 | 5/2014 | Yamada | |
| 2014/0177449 A1 | 6/2014 | Novak et al. | |
| 2014/0177458 A1 | 6/2014 | Novak et al. | |
| 2014/0177537 A1 | 6/2014 | Novak et al. | |
| 2014/0177539 A1 | 6/2014 | Novak et al. | |
| 2014/0177540 A1 | 6/2014 | Novak et al. | |
| 2014/0177542 A1 | 6/2014 | Novak et al. | |
| 2014/0226629 A1* | 8/2014 | Kim | H04W 36/0016 370/331 |
| 2014/0241262 A1 | 8/2014 | Novak et al. | |
| 2014/0378150 A1* | 12/2014 | Li | H04W 76/023 455/450 |
| 2015/0126188 A1 | 5/2015 | Lindoff et al. | |
| 2015/0189546 A1* | 7/2015 | Earnshaw | H04L 1/1858 370/329 |

FOREIGN PATENT DOCUMENTS

| | | |
|---|---|---|
| CN | 102395160 | 3/2012 |
| WO | 2010/082084 | 7/2010 |
| WO | 2011/050519 | 5/2011 |
| WO | 2011/116815 | 9/2011 |
| WO | 2012/059636 | 5/2012 |
| WO | 2012/088470 | 6/2012 |
| WO | 2012/091420 | 7/2012 |
| WO | 2012/161549 | 11/2012 |
| WO | 2012/164248 | 12/2012 |

OTHER PUBLICATIONS

Xu, Shaoyi et al.; "Effective Labeled Time Slots Based D2D Transmission in Cellular Downlink Spectrums"; 71st Vehicular Technology Conference (VTC 2010-Spring); May 2010; 5 pages.
International Search Report and Written Opinion of the International Searching Authority issued in International Application No. PCT/CA2014/050149 on Jun. 2, 2014; 9 pages.
Office Action issued in U.S. Appl. No. 13/724,254 on Sep. 2, 2014.
Office Action issued in U.S. Appl. No. 13/723,926 on Jul. 31, 2014.
Office Action issued in U.S. Appl. No. 13/723,926 on Nov. 10, 2014.
Office Action issued in U.S. Appl. No. 13/781,469 on Nov. 20, 2014.
Office Action issued in U.S. Appl. No. 13/725,570 on Dec. 17, 2014.
Office Action issued in U.S. Appl. No. 13/724,020 on Dec. 11, 2014.
Office Action issued in U.S. Appl. No. 13/725,562 on Jan. 15, 2015.
3GPP TS 36.211 v10.3.0,"Evolved Universal Terrestrial Radio Access (E-UTRA) and Evolved Universal Terrestrial Radio Access Network (E-UTRAN); Physical channel and modulation (Release 10)", Sep. 2011.
3GPP TS 36.213 v10.3.0,"Evolved Universal Terrestrial Radio Access (E-UTRA) and Evolved Universal Terrestrial Radio Access Network (E-UTRAN); Physical layer procedures (Release 10)", Sep. 2011.
3GPP TS 36.300 v10.2.0,"Evolved Universal Terrestrial Radio Access (E-UTRA) and Evolved Universal Terrestrial Radio Access Network (E-UTRAN); Overall description ;Stage 2 (Release 10)", Dec. 2010.
3GPP TS 36.331 v10.3.0,"Evolved Universal Terrestrial Radio Access (E-UTRA) and Evolved Universal Terrestrial Radio Access Network (E-UTRAN); Radio Resource control (RRC) protocol specification (Release 10)", Sep. 2011.
3GPP TS 36.321 v10.3.0,"Evolved Universal Terrestrial Radio Access (E-UTRA) and Evolved Universal Terrestrial Radio Access Network (E-UTRAN); Medium access control protocol specification (Release 10)", Sep. 2011.
3GPP TS 36.304 v10.3.0,"Evolved Universal Terrestrial Radio Access (E-UTRA) and Evolved Universal Terrestrial Radio Access Network (E-UTRAN); User equipment (UE) procedures in idle mode (Release 10)", Sep. 2011.
3GPP TS 36.212 v10.3.0,"Evolved Universal Terrestrial Radio Access (E-UTRA) and Evolved Universal Terrestrial Radio Access Network (E-UTRAN); Multiplexing and channel coding (Release 10)", Sep. 2011.
International Search Report issued in International Application No. PCT/CA2013/050999 on Feb. 21, 2014.
International Search Report issued in International Application No. PCT/CA2013/051002 on Feb. 24, 2014.
Office Action issued in U.S. Appl. No. 13/724,254 on May 13, 2014.
International Search Report and Written Opinion of the International Searching Authority issued in International Application No. PCT/CA2013/050998 on Apr. 8, 2014; 8 pages.
Office Action in U.S. Appl. No. 13/724,254, dated Mar. 17, 2015.
Office Action in U.S. Appl. No. 13/781,469, dated Mar. 9, 2015, 13 pages.
Office Action in U.S. Appl. No. 13/724,723, dated Mar. 11, 2015.
Extended European Search report issued in European Application No. 13863767.3 on Sep. 1, 2016.
Extended European Search Report issued in European Application No. 14757121.0 on Sep. 15, 2016.
Office Action issued in Canadian Application No. 2895959 on Oct. 4, 2016.
Office Action issued in Canadian Application No. 2,902,939 on Oct. 25, 2016.
Extended European Search Report issued in European application No. 13865613.7 on Jun. 22, 2016.
Office Action issued in Canadian Application No. 2,895,961, dated Jun. 17, 2016.

* cited by examiner

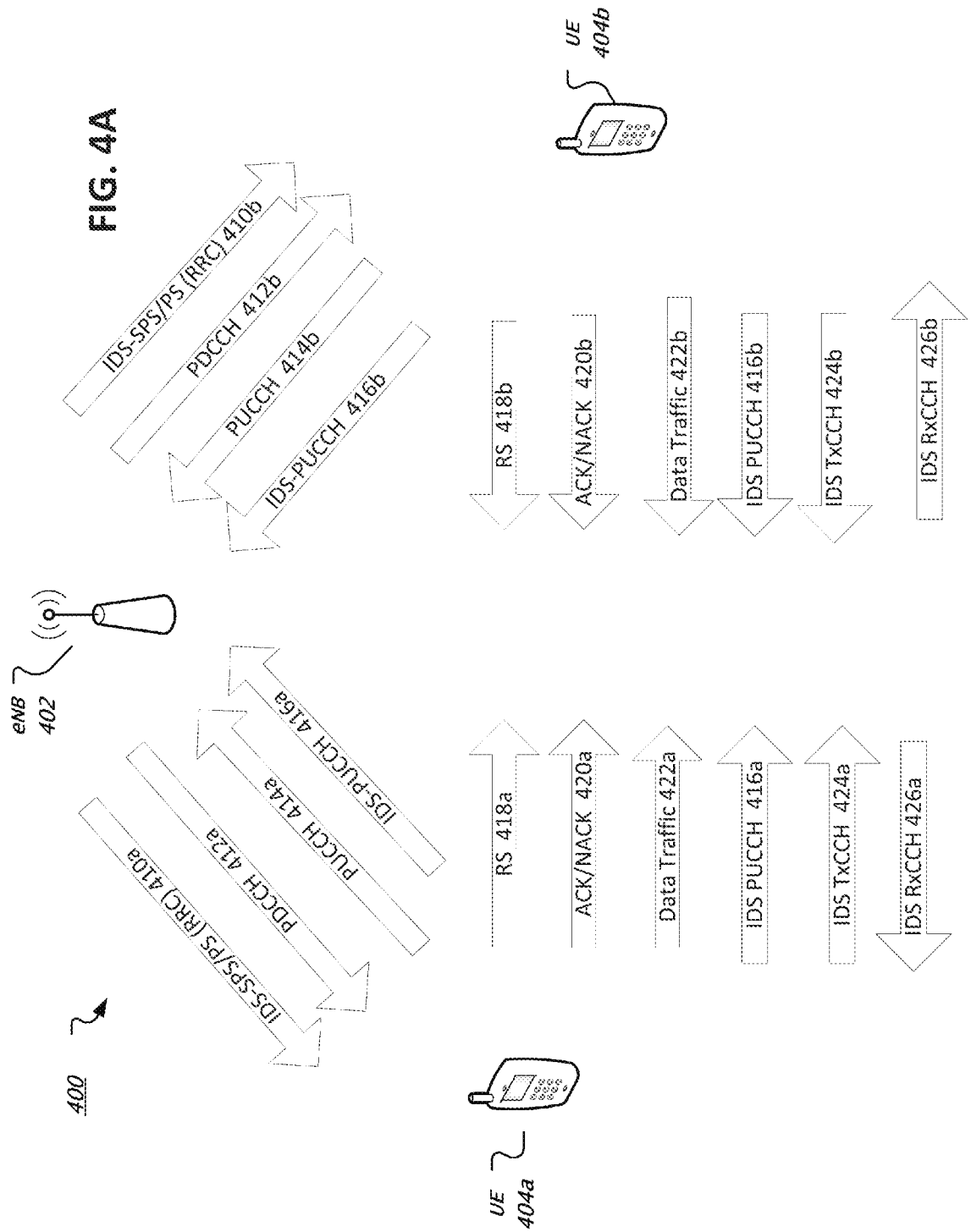

RESOURCE SCHEDULING IN DIRECT DEVICE TO DEVICE COMMUNICATIONS SYSTEMS

FIELD

This disclosure relates to direct device-to-device (DD2D) communications in a mobile communications network.

BACKGROUND

Communication networks include wired and wireless networks. Example wired networks include the Public Switched Telephone Network (PSTN) and Ethernet local area networks. Example wireless networks include licensed cellular networks as well as unlicensed wireless networks that connect to wired networks. Calls and other communications may be connected across wired and wireless networks.

In wireless cellular networks, mobile devices generally communicate with each other by transmitting and receiving data traffic through base stations or other similar network nodes, even when the mobile devices are in close proximity. Direct communications between mobile devices in a licensed band without network control can cause interference to other mobile devices operating in the network.

With the proliferation of devices equipped with a cellular modem, direct device-to-device communication offers itself as a potential feature that may significantly enhance the performance of wireless communications technology.

Furthermore proximity-based applications and services represent a recent and enormous social-technological trend. The introduction of a direct communication capability would allow the wireless communications industry to promote this important trend. Additionally, there is also interest in the ability to offload the network in some cases via direct device-to-device communication.

DESCRIPTION OF DRAWINGS

FIG. 4A is a schematic illustrating an example of signaling and traffic for an inter-device session (IDS), where a first user equipment UE receives signaling feedback directly from a second UE.

Like reference symbols in the various drawings indicate like elements.

DETAILED DESCRIPTION

Figure 1:
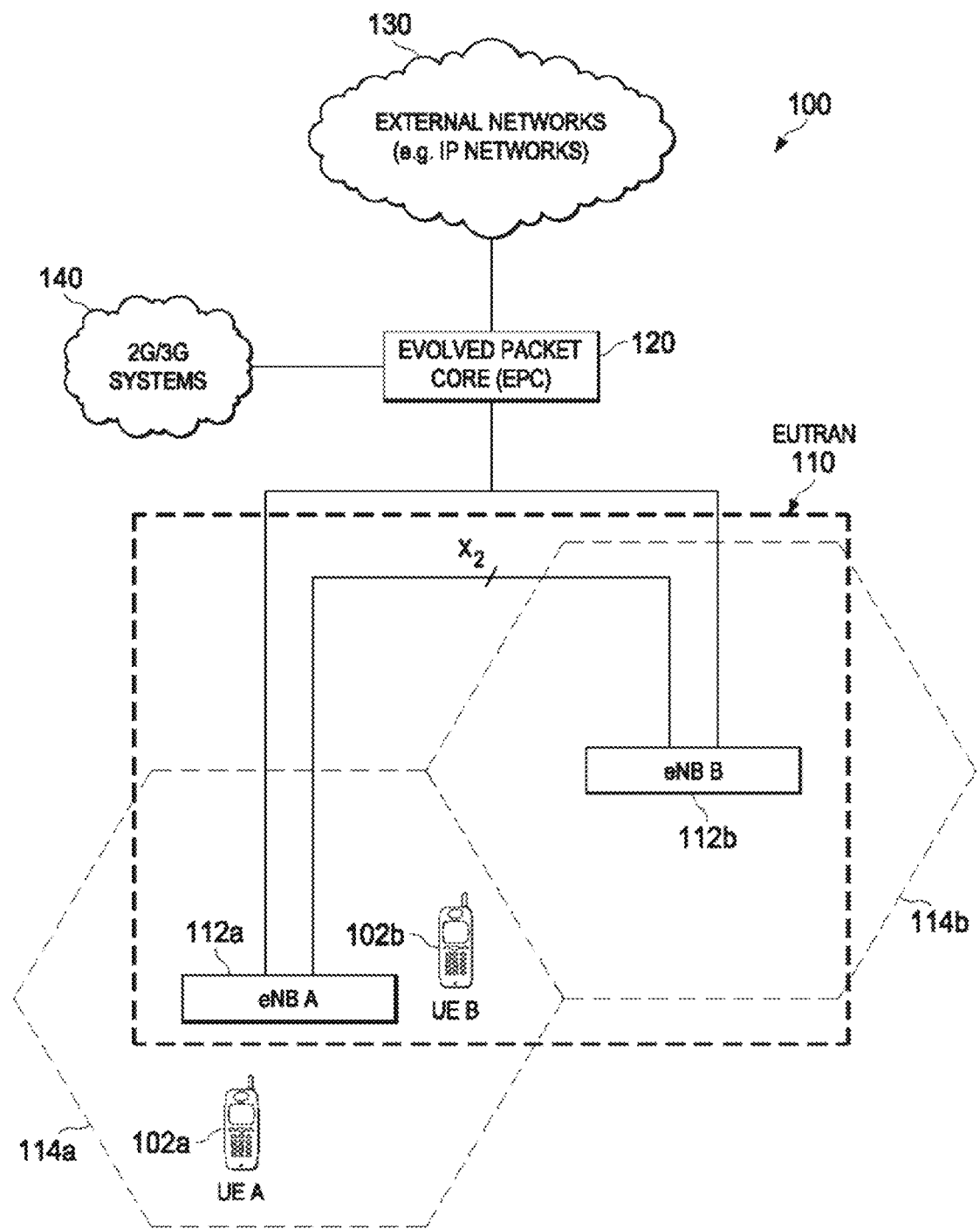
FIG. 1 is a schematic block diagram of an example mobile communication system.

Certain aspects of the present disclosure pertain to systems, apparatuses, and methods performed by a network node of a wireless communications network. Configuration information can be transmitted to a first user equipment (UE) (UE1 configuration information) for an inter-device session (IDS) between the first UE and a second UE, the UEconfiguration information including a first IDS radio network temporary identifier (IDS-RNTI). A radio resource control (RRC) message indicating a resource allocation can be transmitted, e.g., to the first UE or the first and second UEs, for the first UE to communicate directly with the second UE.

In certain implementations, configuration information for the second UE (UE2 configuration information) for an inter-device session (IDS) between the first UE and a second UE can be transmitted to UE2, the UE2 configuration information including a second IDS radio network temporary identifier (IDS-RNTI). A radio resource control (RRC) message can be transmitted to the second UE indicating a resource allocation for the first UE to communicate directly with the second UE.

In certain implementations, the RRC message may be transmitted to the first UE and the second UE separately.

In certain implementations, the RRC message may be repeatedly transmitted to the first UE and the second UE. The first UE and the second UE can be instructed to refrain from transmitting acknowledgement/negative acknowledgement (ACK/NACK) messages.

In certain implementations, the resource allocation identifies a resource for hybrid automatic repeat request (HARQ) transmissions. In certain implementations, the resource allocation identifies a resource for the first HARQ transmission, and the method further comprises identifying resources for subsequent HARQ retransmissions.

In certain implementations, an indication of an IDS-physical uplink control channel (IDS-PUCCH) of the first UE may be transmitted to the second UE, the IDS-PUCCH identifying a resource on which to transmit an acknowledgment/negative acknowledgement (ACK/NACK) indicator. The first UE can be instructed to receive the ACK/NACK indicator from the second UE.

In certain implementations, the first UE and the second UE are configured to refrain from transmitting acknowledgement/negative acknowledgement (ACK/NACK) messages in response to IDS transmissions. The maximum number of transmissions may be configured and known to the UEs In certain implementations, wherein the transmitting UE may adjust the modulation and coding scheme (MCS) of the UE-to-UE transmission. The transmitting UE indicating the MCS change or new MCS via an IDS-MAC CE, where the IDS-MAC CE is sent over direct device-to-device resources.

In certain implementations, the transmitting UE may adjust the IDS transmission power level of the UE-to-UE transmission. The transmitting UE can indicate the IDS transmission power level change or new IDS transmission power level via an IDS-MAC CE, where the IDS-MAC CE is sent over direct device-to-device resources.

In certain implementations, the transmission on the resources allocation is scrambled by one of the IDS-RNTI of the UE-to-UE session, the IDS-SPS, or IDS-PS RNTI, as configured by the RRC resource allocation.

In certain implementations, the resource allocation identifies a resource for the first HARQ transmission. Resources for ACK/NACK transmission from UE2 can be configured in response to IDS transmissions; and allocating IDS resources for re-transmissions according to the ACK/NACK feedback.

Certain implementations may include transmitting to the first and second UE the configuration of an IDS receiver control channel (IDS-RxCCH), the IDS-RxCCH configuration identifying a resource on which to transmit feedback directly from UE2 to UE1.

Certain implementations may include transmitting to the first and second UE the configuration of an IDS transmitter control channel (IDS-TxCCH), the IDS-TxCCH configuration identifying a resource on which to transmit control information directly from UE1 to UE2. In implementations where UE1 is the transmitting UE, UE1 may use the IDS-TxCCH indicate a change in the modulation and coding scheme (MCS) of the UE-to-UE transmission. In some implementations, UE1 is the transmitting UE and may use the IDS-TxCCH to indicate a change in the transmission parameters of the UE-to-UE transmission. In implementations when UE2 is the receiving UE, UE2 may use the IDS-RxCCH to instruct UE1, the transmitting UE, to adjust the IDS transmission power level of the UE-to-UE transmission. In implementations when UE2 is the receiving UE, UE2 may use the IDS-RxCCH to send IDS CQI information to UE1, the transmitting UE. In implementations where UE2 is the receiving UE, UE2 may use the IDS-RxCCH to send ACK/NACK indications to UE1, the transmitting UE. In implementations where UE2 is the receiving UE, UE2 may use the IDS-RxCCH to send a request for a transmission opportunity to UE1, the transmitting UE.

Certain aspects of the disclosure are directed to systems, methods, and apparatuses for providing an inter-device session where the devices can communicate directly, and where the network and the network operator maintain an acceptable level of control over the device-to-device communication. In the present application, the term "directly" is used to indicate communications between devices and/or communications between a device and a network element without intervening devices. For example, a first UE can transmit data and feedback signaling directly to a second UE without having to transmit the data and feedback signaling to a network element. In the interest of consistency, certain examples in this disclosure may be described in relation to Long Term Evolution (LTE) technology. However, similar device-to-device communications aspects described in this disclosure may also be applied to other wireless communications technologies.

In this disclosure, direct device-to-device communications may be referenced as an inter-device session (IDS). An inter-device session (IDS) may include configuration to allow communication between two or more UEs. For a given IDS resource allocation, one UE in the session may be transmitting in an allotted resource, and other UEs in the session are expected to be receiving in that allotted resource. It should be understood that the IDS resource may be allocated in resources that may previously be considered "uplink" or "downlink" resources. A first UE may transmit over the IDS resource, and one or more other UEs will receive the transmission over the IDS resource. Therefore, in some implementations, the IDS resource may be allocated from either "uplink" or "downlink" portions of the resource pool, where the IDS resource is used for inter-device communications.

The term inter-device session is meant to encompass scenarios where two or more devices transmit and/or receive data directly with one another via a radio channel shared by the two or more devices. As such, the term inter-device session may also be referred to as a multi-device session, plural-device session, Direct Device-to-Device(s) (DD2D), LTE Direct, or other representative terms.

In this application, a name with the prefix "IDS" (Inter-Device Session) refers to an entity, resource, or other concept related to the direct UE-to-UE(s) (Device-to-Device(s) (or D2D)) connection (e.g., IDS-PUCCH, IDS-PUSCH, IDS-RNTI) while a name without the "IDS" prefix refers to an entity related to standard UE-to-eNB connections (e.g., physical uplink control channel (PUCCH), physical uplink shared channel (PUSCH), physical downlink shared channel (PDSCH), radio network temporary identifier (RNTI), physical downlink control channel (PDCCH)).

In a first example embodiment, an eNB in an LTE system can allocate resources to one user equipment (UE) for direct communication with another UE. It is possible for the UEs to conduct a UE-to-UE data session without continuous eNB involvement. In particular, the transmitting UE may receive the ACK/NACK response sent by the receiving UE(s) in an IDS resource. In this scheme, data traffic and feedback signalling may be transmitted directly between the UEs. It should be understood that while data and feedback signalling may be transferred from one UE to another UE using allocated IDS resources, a network node of a wireless communications network may still be utilized to control certain aspects of the IDS. For example, a Physical Uplink Control Channel (PUCCH) and other control channels may be used to transmit control information related to an IDS to the eNB from each UE as needed. Additionally, in some embodiments, the UEs may also listen to the other UE's PUCCH, Sounding Reference Signals (SRS) or other reference signal transmissions where the eNB is the primary intended recipient. Further, in some embodiments, control information such as resource allocation, Modulation and Coding Scheme (MCS) for traffic, and power control commands related to an IDS may be transmitted to the UE(s) from the eNB; in other embodiments, some of this control information may be exchanged directly between UEs.

After session initiation, each of the UEs may be assigned an inter-device session semi-persistent scheduling (IDS-SPS) or inter-device session persistent scheduling (IDS-PS) assignment for transmission (described in more detail below). Due to this assignment, the reoccurring resources for UE-to-UE transmissions are known to the other UEs, so no further allocations need to be signaled by the eNB. In one embodiment, the UEs may be given the location and configuration of the other UE's IDS-PUCCH. The IDS PUCCH is a PUCCH configuration with ACK/NACK, CQI and other feedback related to the IDS configured by the eNB. Knowing the other UE's IDS-PUCCH, the eNB may instruct the UE to read the ACK/NACK response of the other UE to the UE-to-UE packet transmission. By reading this information, further allocations and ACK/NACK responses from the eNB are not required, and the UEs may transfer data autonomously. The behavior of the UE is indicated in Table 1.

TABLE 1

UL HARQ Operation for UE-UE IDS-SPS Autonomous Mode

| HARQ feedback seen by the UE | UE behaviour (next IDS-SPS opportunity) |
|---|---|
| ACK | New transmission |
| NACK | Non-adaptive retransmission |

In some embodiments, the IDS-PUCCH is configured for a UE to provide feedback related to the IDS channel as described. In further examples in this document, the examples focus on the IDS-PUCCH format of UE-to-UE feedback; however, channel structures are possible. In some embodiments, the feedback can be given over an IDS receiver control channel (IDS-RxCCH) that is configured as part of an IDS link that may or may not have the same physical structure as the PUCCH channel. In some other embodiments, this signaling is transmitted within resources allocated for IDS transmission. In yet some other embodiments, control and feedback information is exchanged directly between UEs via IDS MAC control elements (CEs) transmitted over the allocated IDS resources. In general, one or more or all of the control channels may be defined for an IDS.

In the previous example of operation, the control information provided directly UE-to-UE is ACK/NACK response to IDS transmissions; however, other feedback types are possible for any of the UE-to-UE control channel discussed. This feedback could include CQI/CSI, ACK/NACK, scheduling request, transmit power control or other receiver feedback and control information. In some cases, one or more of these information elements can be sent in the same message.

Further in the previous example of operation, the location and configuration information of the IDS-PUCCH, or the IDS-RxCCH, of one UE can be given to the other UE for receiving so that direct UE-to-UE feedback can occur. In some other embodiments, the location and configuration of the IDS-PUCCH or IDS-RxCCH may be inherent in the structure of the IDS channel, obviating the need for an eNB to provide this information explicitly to the UEs.

The terms UE1 and UE2 are used here for simplicity and clarity, and are not meant to convey a particular order of the process, a particular actor, or limit the number of devices involved.

Each inter-device session is identified by an inter-device session radio network identifier (RNI) that is assigned by the network node (e.g., eNB) of the wireless communications network. One example of a radio network identifier used in accordance with this disclosure is a radio network temporary identifier assigned to an inter-device session in an LTE system (IDS-RNTI). PDCCH/enhanced physical downlink control channel (ePDCCH) messages related to an IDS may be configured with the IDS-RNTI. Therefore, a UE must attempt to decode PDCCH/ePDCCH messages using the IDS-RNTI(s) assigned to its session(s). This may be done in addition to decoding messages addressed to other RNTIs associated with the UE. The term "configured with" can include, among other things, configured by, corresponding to, addressed to, directed to, scrambled with, encoded with, portion encoded with (e.g., cyclic redundancy check (CRC) scrambled with the radio network identifier (RNI), such that the control message can be determined to be addressed to a UE that knows the RNI), referencing, etc.

IDS resource allocations signalled in the PDCCH/ePDCCH and configured with the IDS-RNTI may indicate grants for direct UE-to-UE transmissions. IDS resource allocations may be signalled in control messages sent from the eNB to one or more UEs participating in the inter-device session. In one embodiment, a control message configured with an IDS-RNTI assigned to an individual UE is sent to each of the UEs participating in the inter-device session, such that the UEs are all made aware of the IDS resource allocations being granted for the inter-device session. In another embodiment where the IDS-RNTI refers to a session with two or more UEs, the IDS resource allocation configured with the IDS-RNTI may also be configured with a UE session ID associated with one of the UEs in the IDS (for example, the grant of the IDS resource allocation may include the UE session ID of the UE that should transmit using the IDS resource).

In an alternate embodiment, there may be more than one IDS Radio Network Temporary Identifier (RNTI) assigned for an inter-device session. For example, a first IDS-RNTI is assigned to indicate transmission from a first UE to a second UE, while a second IDS-RNTI may be assigned to indicate transmissions from the second UE to the first UE. In this alternate embodiment, each IDS-RNTI may be assigned for a particular transmission direction, or more specifically, to a particular UE that may act as a transmitter in the inter-device session. In this alternate embodiment, the network node (e.g., eNB) may maintain a group context that includes a first UE's unique IDS-RNTI, and the other UEs that are configured to receive transmission from the first UE; the eNB also provides the other UEs with the first UE's unique IDS-RNTI so that the other UEs can identify resource allocations where they act as a receiver.

Advantages of using the IDS-RNTI as described in this disclosure may be numerous. For example, the network node (e.g., eNB) can use the IDS-RNTI to control allocation for each transmission thereby ensuring that UE-UE communications do not interfere with neighbouring UEs. Meanwhile sharing an IDS-RNTI amongst UEs participating in the inter-device session may reduce control channel overhead since one Physical Downlink Control Channel (PDCCH) transmission is used to signal allocations for both the transmitter and receiver(s).

FIG. 1 is a schematic block diagram of an example mobile communication system 100. The mobile communication system 100 shown in FIG. 1 may include one or more network nodes (e.g., 112a and 112b). It will be understood that the network node may take several forms in a mobile communication system, such as (but not limited to) an evolved Node B (eNB), a base station, a Node B, a wireless access point, a radio network controller, a base transceiver station, a layer two relay node, a layer three relay node, a femto cell, home evolved Node B (HeNB), a home Node B (HNB), a base station controller, or other network node that includes radio resource control. In the long term evolution (LTE) example of FIG. 1, the network nodes are shown as evolved Node Bs (eNBs) 112a and 112b. The example mobile communication system 100 of FIG. 1 may include one or more radio access networks 110, core networks (CNs) 120, and external networks 130. In certain implementations, the radio access networks 110 may be evolved-UMTS terrestrial radio access networks (E-UTRAN). In addition, in certain instances, core networks 120 may be evolved packet cores (EPCs). Further, there may be one or more mobile electronic devices 102a, 102b operating within the mobile communication system 100. In some implementations, 2G/3G systems 140, e.g., Global System for Mobile communication (GSM), Interim Standard 95 (IS-95), Universal Mobile Telecommunications System (UMTS) and CDMA2000 (Code Division Multiple Access) may also be integrated into the mobile communication system 100.

In the example LTE system shown in FIG. 1, the radio access network 110 includes eNB 112*a* and eNB 112*b*. Cell 114*a* is the service area of eNB 112*a*, and Cell 114*b* is the service area of eNB 112*b*. In this example, UEs 102*a* and 102*b* operate in Cell 114*a* and are served by eNB 112*a*. The UEs 102*a* and 102*b* may be any electronic device used by an end-user to communicate, for example, within the mobile communication system 100. The UEs 102*a* and 102*b* may transmit voice data, video data, user data, application data, multimedia data, text, web content and/or any other content.

The UE 102*a* or 102*b* may be referred to as mobile electronic device, user device, mobile station, subscriber station, portable electronic device, mobile communications device, wireless modem, or wireless terminal. Examples of a UE (e.g., UE 102*a* or 102*b*) may include a cellular phone, personal data assistant (PDA), smart phone, laptop, tablet personal computer (PC), pager, portable computer, portable gaming device, wearable electronic device, or other mobile communications device having components for communicating voice or data via a mobile communication network.

Other examples of a UE include, but are not limited to, a television, a remote controller, a set-top box, a computer monitor, a computer (including a tablet, a desktop computer, a handheld or laptop computer, a netbook computer), a microwave, a refrigerator, a stereo system, a cassette recorder or player, a DVD player or recorder, a CD player or recorder, a VCR, an MP3 player, a radio, a camcorder, a camera, a digital camera, a portable memory chip, a washer, a dryer, a washer/dryer, a copier, a facsimile machine, a scanner, a multi-functional peripheral device, a wristwatch, a clock, and a game device, etc. The UE 102*a* or 102*b* may include a device and a removable memory module, such as a Universal Integrated Circuit Card (UICC) that includes a Subscriber Identity Module (SIM) application, a Universal Subscriber Identity Module (USIM) application, or a Removable User Identity Module (R-UIM) application. Alternatively, the UE 102*a* or 102*b* may include the device without such a module. The term "UE" can also refer to any hardware or software component that can terminate a communication session for a user. In addition, the terms "user equipment," "UE," "user equipment device," "user agent," "UA," "user device," and "mobile device" can be used synonymously herein.

A radio access network is part of a mobile communication system which implements a radio access technology, such as UMTS, CDMA2000 and 3GPP LTE. For example, the radio access network (RAN) 110 included in an LTE telecommunications system is called an EUTRAN. The EUTRAN can be located between the UEs and core network 120 (e.g., an evolved packet core, EPC). The EUTRAN includes at least one eNB. The eNB can be a radio base station that may control all or at least some radio related functions in a fixed part of the system. The at least one eNB can provide radio interface within their coverage area or a cell for the UEs to communicate. The eNBs may be distributed throughout the cellular network to provide a wide area of coverage. The eNBs directly communicate with one or more UEs, other eNBs, and the core network.

This disclosure describes several ways that an inter-device session may be initiated. For example, a UE could initiate an inter-device session responsive to a user action, the presence of data at the device intended for a potentially nearby device, detection of signals from a proximate device, or an in-device application exchanging location information with other devices. Alternatively, the network could create an inter-device session at its discretion, based on one or more of the following factors: UE location, network traffic, operator policies, user subscription and UE capabilities.

Once it is determined that attempting an IDS connection between two or more UEs is appropriate, the eNB sends IDS configuration information to the UEs to enable the inter-device session. IDS configuration information for each UE may include the IDS-RNTI and, optionally, a UE session ID used to identify the UE within this IDS as well as the SRS/RS and IDS PUCCH channel assigned to the UE. The IDS configuration information may also be used to facilitate various aspects such as timing and Channel Quality Indicator (CQI) feedback.

Furthermore, if the UE is transmitting and/or receiving in multiple inter-device sessions, the eNB may configure the UE with multiple IDS-RNTIs. The eNB may maintain an IDS group context for each inter-device session in the eNB coverage area. The IDS group context may include the IDS-RNTI for each UE in the inter-device session, a UE session ID (if configured) for the UE, and identifiers of other UEs that may be part of the inter-device session.

A transmitting UE may align its IDS-transmit-timing with a transmission resource subframe as directed by the network node timing. In one embodiment, the UE may adjust its IDS transmission timing according to a timing advance command from the network node. For example, a first UE (UE1) may be sent a timing advance command from the eNB to adjust UE1's timing for transmitting IDS transmissions using an IDS. A second UE (UE2) may receive the IDS transmissions according to a timing reference detected from UE1. For example, UE1 may be configured with SRS or other reference signal (RS), which UE2 can receive from UE1 to determine receive window timing for IDS transmissions. In this example, the eNB must provide UE2 with information on location/configuration of UE1 RS/SRS. It should be noted that the RS/SRS configuration may be specific for the IDS or may be the same RS/SRS configuration used by UE1 for communication with the eNB.

As described previously, an IDS resource may use UL radio resources or DL radio resources. For time division duplex (TDD) implementations, the IDS resource allocation may include assignment of particular subframes. For frequency division duplex (FDD) implementations, the IDS resource allocation may include assignment of particular sub-band frequencies. In other implementations, the IDS resource allocation may include assignment of particular component carriers.

For example, in some embodiments, a UE may not be able to transmit and receive UE-UE (IDS) and UE-eNB transmissions at the same time. Considering an example where UL radio resources are used for the IDS resource allocations, the eNB may allocate the IDS resource such that a UE receives IDS transmissions in an UL subframe that is different from another UL subframe that the UE uses for other uplink transmissions to the eNB. In other words, the eNB may not schedule a UE as the receiving UE in an IDS assignment in a subframe where the UE is scheduled to send a PUCCH, IDS-PUCCH, SRS/RS, or UL-SCH transmission. In addition, the eNB may assign PUCCH and IDS-PUCCH transmission to occur in different UL subframes for UEs on the same inter-device session in order to allow for UEs in the session to receive and/or measure the other UEs PUCCH/IDS-PUCCH for the purposes of CQI feedback and/or timing. Just as UL subframes and UL radio resources may be scheduled to avoid overlap with other UL operations of a UE, there may be implementations where DL radio resources are used for IDS resource allocations, and scheduling is carefully done to avoid overlap with other DL operations of a UE. In some FDD embodiments, a UE may be able to receive both IDS-PUSCH transmissions and PDSCH transmissions in the same subframe on different carriers. In other embodiments, a UE may only be able to receive either an IDS-PUSCH transmission or a PDSCH transmission, but not both, within a given subframe. The capabilities of the UE are signaled to the eNB during radio resource control (RRC) connection configuration.

The eNBs 112a and 112b may be the end point of the radio protocols towards the UEs 102a, 102b and may relay signals between the radio connection and the connectivity towards the core network 120. In certain implementations, the EPC may be the main component of a core network 120. The core network 120 may include a backbone network, which may be a central part of the mobile communication system 100. The core network 120 may include other components, such as (but not limited to) a mobility management entity (MME), a serving gateway (SGW), and/or a packet data network gateway (PGW). The MME may be the main control element in the core network 120 responsible for the functionalities comprising the control plane functions related to subscriber and session management. The SGW can serve as a local mobility anchor, such that the packets are routed through this point for intra radio access network 110 (e.g., intra-EUTRAN) mobility and mobility with other legacy 2G/3G systems 140. The SGW functions may include the user plane tunnel management and switching. The PGW may provide connectivity to the services domain comprising external networks 130, such as the IP networks. The UEs 102a, 102b, radio access network 110 (e.g., EUTRAN), and core network 120 (e.g., EPC) are sometimes referred to together as the evolved packet system (EPS).

Though described in terms of FIG. 1, the present disclosure is not limited to such an LTE environment.

Figure 2:
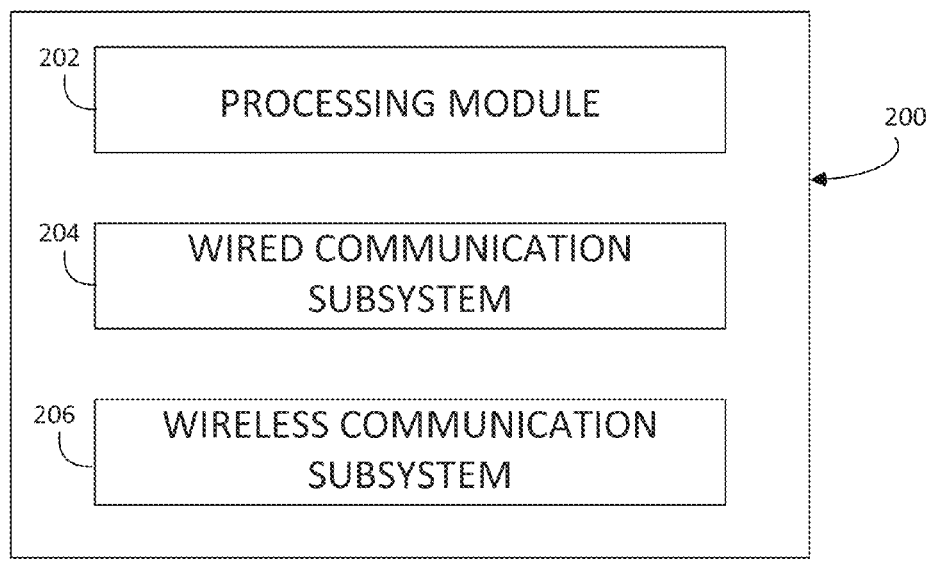
FIG. 2 is a schematic illustrating an example network node.

FIG. 2 is a schematic illustrating an example network node 200. The example network node 200 includes a processing module 202, a wired communication subsystem 204, and a wireless communication subsystem 206. The processing module 202 can include one or more processing components (alternatively referred to as "processors" or "central processing units" (CPUs)) operable to execute instructions associated with managing inter-device communications. The processing module 202 can also include other auxiliary components, such as random access memory (RAM), read only memory (ROM), secondary storage (for example, a hard disk drive or flash memory). The processing module 202 can execute certain instructions and commands to provide wireless or wired communication, using the wired communication subsystem 204 or a wireless communication subsystem 206. A skilled artisan will readily appreciate that various other components can also be included in the example network node 200.

The network node may establish an inter-device session by sending IDS configuration information (e.g., RRC connection reconfiguration) to each UE that will be part of the inter-device session. For example, the IDS configuration information may be sent in a configuration message (e.g., an RRC message) to each UE in the inter-device session. It should be understood that the IDS configuration information may not be identical for each UE in the IDS, but the IDS configuration information sent to each UE includes the configuration needed for the UE to participate in the IDS. The IDS configuration information may include an IDS-RNTI used to configure other IDS-related control messages sent to the UE. For example, the network node sends a control message to indicate an allocation of IDS resources (e.g., IDS-PUSCH/PDSCH) for at least the transmitting UE in the inter-device session using a PDCCH Downlink Control Information (DCI) configured with the IDS-RNTI. In addition, in some implementations, other control messages may be sent using a PDCCH DCI configured with the IDS-RNTI.

In one embodiment, the network node may manage the power level of the IDS transmissions based on the level of the signal from the transmitting UE received by the receiving UE. The receiving UE may indicate the received signal level to the network node, such that the network node may send a command to the transmitting UE to adjust the power level for subsequent IDS transmissions. For purpose of adjusting the power levels, the network node may configure a special transmit power control RNTI for the IDS for a given UE, including a Transmit Power Control (TPC)-IDS-RNTI (to identify transmit power commands for the IDS transmissions by the UE) in the IDS configuration information. In some embodiments, the power level may be increased until an upper limit is reached. When the power level is beyond a limiting threshold for a UE, the network node may determine that the inter-device session is no longer appropriate and cause the inter-device session to terminate.

In some embodiments, power control commands may be specific for either IDS-PDSCH communications in normally DL radio resources or IDS-PUSCH communications in normally UL radio resources for a given UE. In this embodiment, the network node may configure special transmit power control RNTIs for the IDS for a given UE, including an IDS-TPC-PUSCH-RNTI (to identify transmit power commands for the IDS-PUSCH) and/or IDS-TPC-PDSCH-RNTI (to identify transmit power commands for the IDS-PDSCH) in the IDS configuration information. Once configured, the network node may use special transmit power control RNTIs to signal separate commands to adjust power for IDS communications for a UE in UL radio resources separately from those in DL radio resources.

In some further embodiments, the network node may configure special transmit power control RNTIs for the IDS for a given UE, including an IDS-TPC-SCH-RNTI (to identify transmit power commands for IDS user data transmissions) and/or IDS-TPC-CCH-RNTI (to identify transmit power commands for IDS control data transmissions) in the IDS configuration information. Once configured, the network node may use special transmit power control RNTIs to signal separate commands to adjust power for IDS communications for a UE separately from the power levels used for UL (UE-eNB) communications.

In some embodiments where the receiving UE determines the received signal level of the IDS transmission from an SRS or other reference signal from the transmitting UE, the transmitting UE may also be instructed to adjust the power level for the reference signal in subsequent transmissions.

In some embodiments, the initial transmit power level for IDS transmissions is the same as for UE-to-eNB UL transmissions. In other embodiments, the initial transmit power level is communicated to a UE by the eNB during IDS configuration.

Additionally, to gain more accurate timing for the synchronization of the receive window, the eNB may provide a UE with information on the location and configuration of the other UE's PUCCH and/or SRS (if available) or other reference signal (if available).

Figure 3:
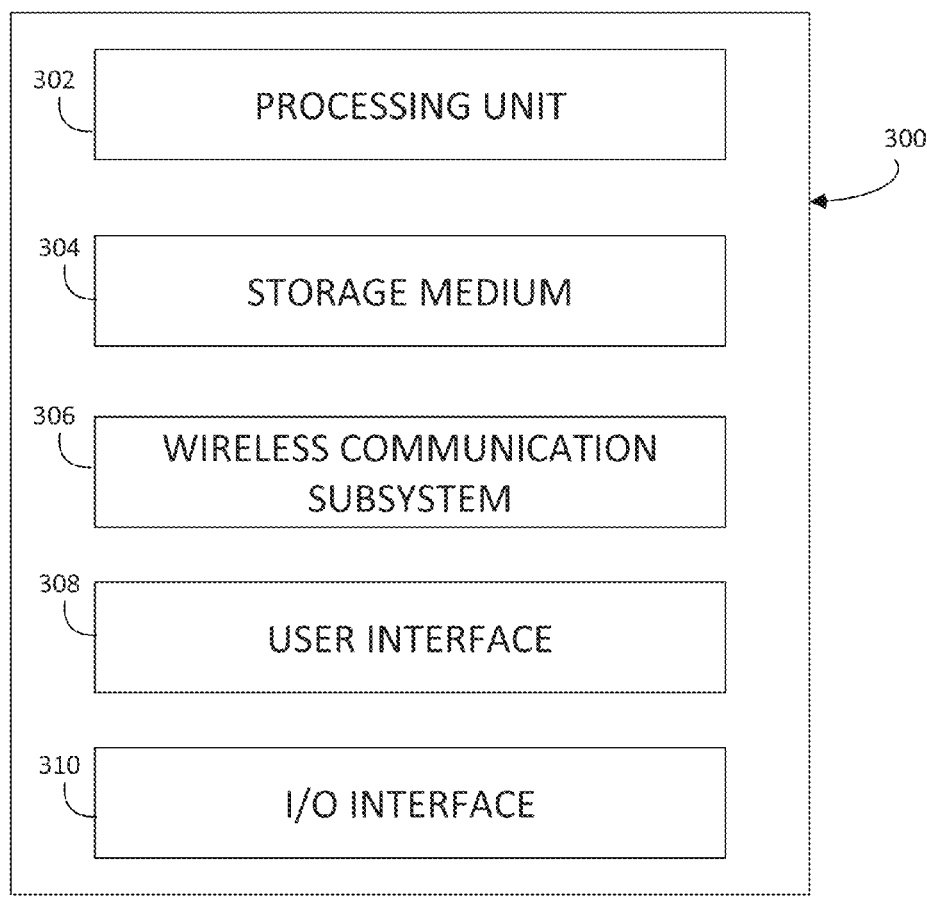
FIG. 3 is a schematic illustrating an example user equipment device.

FIG. 3 is a schematic illustrating an example UE apparatus. The example UE 300 includes a processing unit 302, a computer readable storage medium 304 (for example, ROM or flash memory), a wireless communication subsystem 306, an interface 308, and an I/O interface 310. The wireless communication subsystem 306 may be configured to provide wireless communications for data information or control information provided by the processing unit 302. The wireless communication subsystem 306 can include, for example, one or more antennas, a receiver, a transmitter, a local oscillator, a mixer, and a digital signal processing (DSP) unit. In some embodiments, the wireless communication subsystem 306 can support multiple input multiple output (MIMO) transmissions.

The interface 308 can include, for example, one or more of a screen or touch screen (for example, a liquid crystal display (LCD), a light emitting display (LED), an organic light emitting display (OLED), a microelectromechanical system (MEMS) display), a keyboard or keypad, a trackball, a speaker, and a microphone. The I/O interface 310 can include, for example, a universal serial bus (USB) interface. A skilled artisan will readily appreciate that various other components can also be included in the example UE device 300. The interface 308 may be a hardware interface that permits/facilitates communication between two devices.

A UE may indicate to a network node that the UE has data to send to another UE. For example, the UE may transmit an explicit radio link protocol indication requesting an inter-device session with another UE. Alternatively, the UE may simply send data destined to a network address associated with the other UE. In the typical embodiment, the network node will determine whether or not to attempt establishment of an inter-device session. In one embodiment, the network node may configure a reference signal in inter-device session setup commands to a transmitting UE and a receiving UE. The reference signal is transmitted by the transmitting UE and received by the receiving UE to determine whether the two UEs are in-range to directly communicate. The reference signal may also be used to determine receive timing window and channel state information (CSI). A receiving UE may send a feedback message to the network node to indicate CSI based upon the received reference signal. Alternatively, the receiving UE may send CSI based upon detection of PUCCH RS or SRS transmissions from the transmitting UE. In this alternative, the network node provides the location and/or configuration of PUCCH RS or SRS of the transmitting UE to the receiving UE so that the receiving UE can detect these transmissions. In some embodiments, the network node may provide a C-RNTI, IDS-RNTI, or other RNTI of the transmitting UE to the receiving UE so that the receiving UE is configured to detect the PUCCH transmissions. From feedback about channel state information, the network node may determine to establish the inter-device session. The feedback may also be used by the network node to determine appropriate IDS resource allocations.

In some embodiments, the transmitting UE may send an IDS transmission with the same subframe timing as other UL transmissions intended for the eNB. In some embodiments, the UEs in an inter-device session may be closer to each other than they are to the eNB. In some of these cases, the receiving UE may initially use its UL transmission timing to estimate the receiving window timing of UE-to-UE transmissions. Finer adjustments to the receive window may be made from reception of one or more of IDS-PUSCH transmissions, PUCCH transmissions, IDS-PUCCH transmissions (if available), and SRS transmissions or other reference signals (if available) from the transmitting UE.

In implementations where IDS resources are allocated from DL radio resources, the UEs may send their IDS transmissions at a time offset relative to UL timing as specified by the eNB. In some embodiments, the receiving UE may require a signal from the transmitting UE in order to estimate appropriate timing of the receive window for IDS transmissions prior to the initial reception of IDS-PDSCH transmission. In this case, the receiving UE may use one or more of the SRS or other reference signals or PUCCH or IDS-PUCCH from the transmitting UE.

FIG. 4A is a schematic illustrating an example of signaling and traffic for an inter-device session (IDS), where a first user equipment UE receives signaling feedback directly from a second UE. In FIG. 4A, data traffic 422a and 422b may be transmitted directly between the UEs; the control elements PDCCH (412a and 412b) are transmitted to the UEs from the eNB 402 while IDS related ACK/NACK (420a and 420b) and SRS/RS (418a and 418b) are transmitted to one UE from the other UE. The eNB 402 may transmit an IDS-PUCCH 416a of UE1 404a to UE2 404b. In one embodiment, the UEs may be given the location and configuration of the other UE's IDS-PUCCH 416a and 416b, and instructed by the eNB 402 to read the ACK/NACK response of the other UE to the UE-to-UE packet transmission. The UEs use this information to transfer data directly to one another without further allocations and ACK/NACK responses from the eNB 402. This allows the UEs to transfer data autonomously to one another. The control elements are described below:

PDCCH (412a and 412b): Physical Downlink Control CHannel. A downlink control channel used to support efficient data transmission in LTE. A PDCCH carries a message known as Downlink Control Information (DCI), which may include IDS transmission resource assignments and other control information for a specific UE within an inter-device session or for all UEs within a session. During the inter-device session, a PDCCH message configured via IDS-RNTI may be used to allocate IDS resources to a UE within the session designated as the transmitter within that subframe. The subsequent IDS transmissions may occur over regular PUSCH/PDSCH resources designated by the DCI. HARQ operation, power control and timing adjustments may be included in the DCI by the eNB 402 for the inter-device session. Further, certain transmission multiplexing and session procedures may be used to properly schedule various transmission reception windows for the UEs, as well as minimization of assigned resources during inactivity. In certain implementations, for an IDS allocation, one control message (e.g., a DCI in the PDCCH) may be sent from the eNB that is received and decoded by both transmitting and receiving UEs.

PUCCH (414a and 414b): Physical Uplink Control CHannel. The LTE uplink physical channel carrying uplink control information including Channel Quality Indicators (CQI), Hybrid Automatic Repeat reQuest (HARQ) ACKnowledgment/Negative ACKnowledgment (ACK/NACK) and uplink scheduling requests. In some embodiments, in addition to its normal PUCCH, a UE is configured with an IDS-PUCCH for each inter-device session in which the UE participates.

As described in more detail below, the UE2 404b may send feedback related to the IDS channel and IDS transmissions directly to UE1 configured as part of an IDS link. This feedback could include CQI/CSI, ACK/NACK, scheduling request, transmit power control or other receiver feedback and control information. In some cases, one or more of these information elements can be sent in the same message such as an as IDS-PUCCH. In other cases, the IDS-PUCCH resources (e.g., IDS-PUCCH 416a and 416b) for feedback may be derived from related parameters of the IDS transmission and/or assignment for the purpose of at least NACK/ACK. In some of these implementations, UE1 404a is configured to receive at least the ACK/NACK feedback from UE2 404b, while the eNB 402 may also receive some or all of the feedback from UE2 404b. The feedback to the eNB 402 and UE1 404a may be separate messages, or the same message received by both. In some case, the eNB 402 may ignore the ACK/NACK information as UE1 404a is making the decision on the HARQ process based on the ACK/NACK information it receives.

In some embodiments, the UE2 404b may send feedback related to the IDS channel and IDS transmissions directly to UE1 404a over an IDS control channel (IDS-RxCCH) 426a that is configured as part of an IDS link (and vice versa, with UE1 404a sending feedback to UE2 404b on IDS-RxCCH 426b, in some implementations). This feedback could include CQI/CSI, ACK/NACK, scheduling request, transmit power control or other receiver feedback and control information. In some cases, one or more of these information elements can be sent in the same message. In some cases, the IDS-RxCCH may be defined instead of, or in addition to, the IDS-PUCCH. In other cases, the IDS-RxCCH resources for feedback may be derived from related parameters of the IDS transmission and/or assignment for the purpose of at least NACK/ACK. In some of these implementations, UE1 404a is configured to receive at least the ACK/NACK feedback from UE2 404b over the IDS-RxCCH, while the eNB 402 may also receive some or all of the feedback from UE2 404b over the IDS-PUCCH. The feedback to the eNB 402 and UE1 404a may be separate messages, or the same message received by both. In some cases, the eNB 402 may ignore the information it receives on the IDS-RxCCH as UE1 404a is making decisions based on the IDS-RxCCH information it receives.

In still other embodiments, control and feedback information is exchanged directly between UEs via IDS MAC control elements (CEs) transmitted over the allocated IDS resources.

In addition to the IDS-RxCCH, an IDS transmit control channel (IDS-TxCCH) 424a (from UE1 404a to UE2 404b) and 424b (from UE2 404b to UE1 404a) may be included. The IDS-TxCCH may include transmission parameter modification associated with the transmission on the IDS. For example, the IDS-TxCCH may include but is not limited to modulation and coding scheme (MCS), transmit power change, precoder matrix or other multiple input multi output (MIMO) transmission configuration, packet ID or cyclic packet (as described later), and/or new packet indicator. Generally, a transmitting may be configured with an IDS-TxCCH and a receiver UE with an IDS-RxCCH; however, configurations of none, one or both are possible. In general, resources for IDS-RxCCH and IDS-TxCCH may defined within an IDS control channel IDS-CCH. Both UEs in the session are aware of the location and configuration of the IDS-CCH through implicit configuration through specific or defined IDS resources, or through indication by the eNB 402. The IDS-CCH may include IDS-RxCCH components or IDS-TxCCH components depending on the receiving and transmitting roles of each UE, and the configuration of the IDS.

As an example, an IDS-RxCCH may be configured in resources for feedback from UE2 to UE1, with respect to IDS transmission from UE1 to UE2. In some embodiments, the resources may be within the IDS resources allocation, or may be another periodically re-occurring allocation. In a particular embodiment, the IDS-RxCCH allocations are configured to occur in the interval between IDS transmission between UE1 and UE2. This is a reasonable configuration as it is useful to receive ACk/NACK feedback after a packet transmission, in order to determine that a retransmission is needed prior to the next IDS transmission opportunity. In this case, resources may be allocated via RRC message to UE1 and UE2, and UE2 may provide ACK/NACK, CQI and/or other information directly over these resources. In some embodiments, the time-frequency resources allocated for the IDS-RxCCH from UE2 to UE1 do not include IDS-RxCCH transmission for other inter-device sessions or other transmission (e.g., the IDS-RxCCH is not code multiplexed with other IDS-RxCCH or other transmissions). In another embodiment, the IDS-RxCCH may be configured as part of data traffic IDS resources for transmission from UE2 to UE1, in some cases as a header to the data transmission.

As an example, an IDS-TxCCH may be configured for transmission parameter indication from UE1 to UE2, with respect to IDS transmission from UE1 to UE2. In some embodiments, the resources may be within the IDS resources allocation, or may be another periodically re-occurring allocation. In a particular embodiment, the IDS-TxCCH allocations are configured to occur in the interval between IDS transmission between UE1 and UE2. In this case, resources may be allocated via RRC message to UE1 and UE2, and UE2 may provide MCS, power level indication, new packet indication, and/or other information directly over these resources. The transmission parameter indication may apply for the next IDS transmission and further IDS transmission until a further change or indication is given. In some embodiments, the time-frequency resources allocated for the IDS-TxCCH from UE2 to UE1 do not include IDS-TxCCH transmission for other inter-device sessions or other transmission (e.g., the IDS-TxCCH is not code multiplexed with other IDS-TxCCH or other transmissions). In another embodiment, the IDS-TxCCH may be configured as part of data traffic IDS recourses for transmission from UE2 to UE1, in some cases as a header to the data transmission. In this case, the indication contained in the IDS-TxCCH may apply to data transmission to which it is a header.

As described above, the IDS-RxCCH is for feedback from UE2 to UE1 regarding transmissions from UE1 to UE2, and the IDS-TxCCH is for transmission parameters from UE2 to UE1 regarding transmissions from UE2 to UE1. In some embodiments where two-way communication may be useful between two UEs, and in any of the described IDS-TxCCH example configurations, the IDS-TxCCH may be co-located in an IDS-CCH with an IDS-RxCCH originating from the same UE. For example, UE2 may be configured with an IDS-RxCCH and an IDS-TxCCH. In some embodiments where two-way communication may be useful between two UEs, and in any of the described IDS-TxCCH example configurations, the IDS-TxCCH may be co-located in an IDS-CCH with an IDS-RxCCH originating from the same UE. For example, a set of resources may be assigned for UE2 to send feedback information (IDS-RxCCH) to UE1 which may include ACK?NACK information regarding a previously received IDS transmission from UE1. In additiona, in the same set of resources UE2 may also send to UE1 transmission parameters (in IDS-TxCCH) regarding a transmission to UE1 on IDS resources. In some other embodiments, the resources allocated for IDS-RxCCH and IDS-TxCCH are not related and are allocated separately. For example, in some cases the IDS-TxCCH may be included at the beginning of resources assigned for IDS transmissions so that the IDS-TxCCH transmission parameters apply to the transmission contained in the accompanying transmission. In these cases, if the IDS-RxCCH is configured, it may be configured in separate resources that do not include UE-UE data transmissions.

Figure 4B:
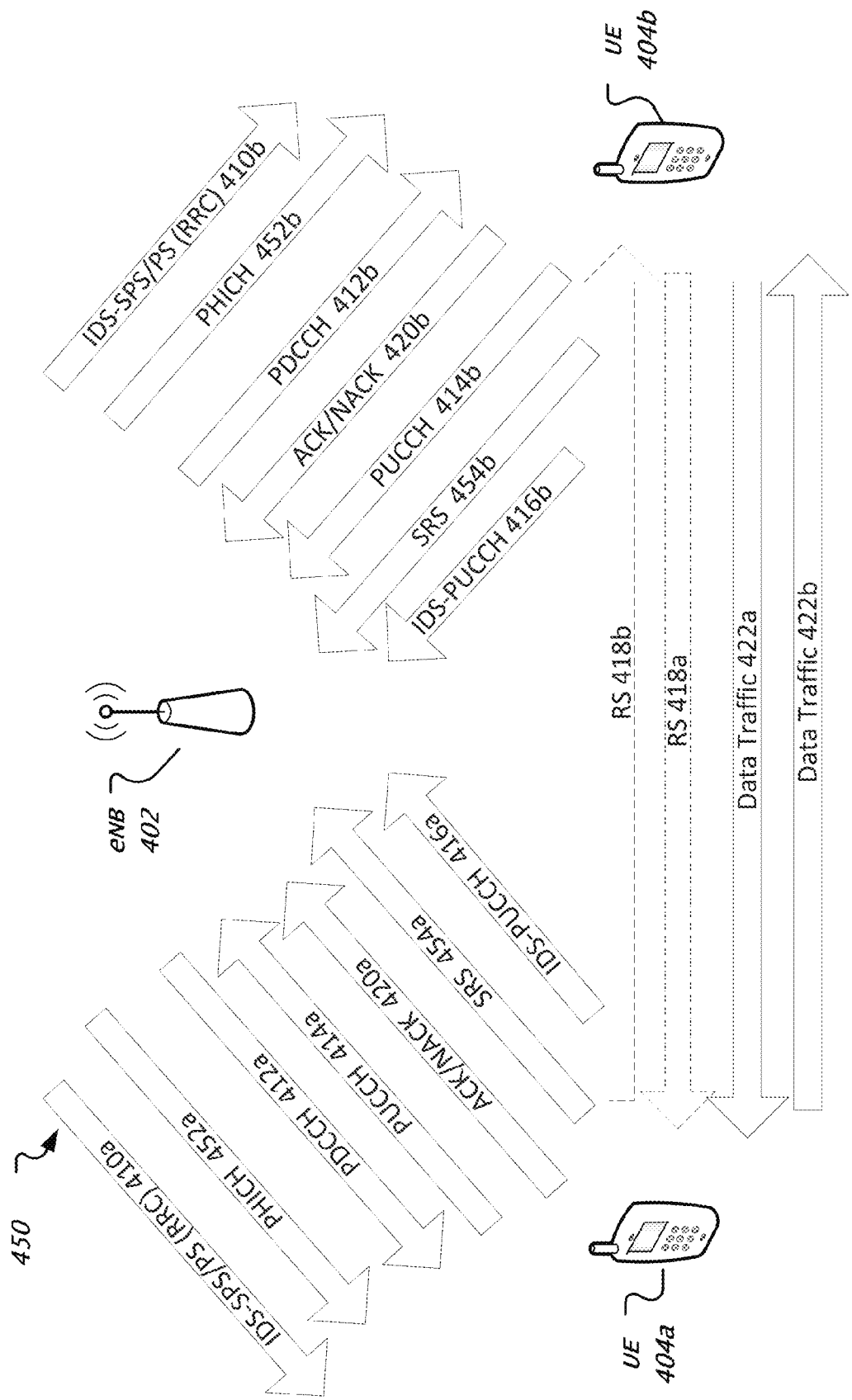
FIG. 4B is a schematic illustrating an example of signaling and traffic for an inter-device session (IDS), where a user equipment (UE) communicates signaling feedback to a network node (e.g., an evolved Node B (eNB)).

FIG. 4B is a schematic illustrating an example of signaling and traffic for an inter-device session (IDS), where user equipment (UE) communicate signaling feedback to a network node (e.g., an evolved Node B (eNB) 402). FIG. 4B includes similar features and reference numbering as in FIG. 4A. In FIG. 4B, data traffic 422a and 422b may be transmitted directly between the UEs; the control elements PDCCH (412a and 412b) are transmitted to the UEs from the eNB while IDS-PUCCH (416a and 416b) and IDS-related ACK/NACK (420a and 420b) and SRS (454a and 454b) are transmitted to the eNB 402 from each UE and may, in some embodiments, be received by the other UE (418a and 418b). These control elements are described below:

PDCCH (412a and 412b): Physical Downlink Control CHannel. A downlink control channel used to support efficient data transmission in LTE. A PDCCH carries a message known as Downlink Control Information (DCI), which may include IDS transmission resource assignments and other control information for a specific UE within an inter-device session or for all UEs within a session. During the inter-device session, a PDCCH message configured via IDS-RNTI may be used to allocate IDS resources to a UE within the session designated as the transmitter within that subframe. The subsequent IDS transmissions may occur over regular PUSCH/PDSCH resources designated by the DCI. HARQ operation, power control and timing adjustments may be included in the DCI by the eNB for the inter-device session. Further, certain transmission multiplexing and session procedures may be used to properly schedule various transmission reception windows for the UEs, as well as minimization of assigned resources during inactivity. In certain implementations, for an IDS allocation, one control message (e.g., a DCI in the PDCCH) may be sent from the eNB 402 that is received and decoded by both transmitting and receiving UEs. In some cases, the HARQ ACK/NACK information regarding an IDS transmission can be fed back to the eNB 402 by the receiving IDS UE and indicated to the transmitting IDS UE on a physical HARQ indicator channel (PHICH) (452a and 452b) from the eNB that is decoded by the transmitting IDS UE.

PUCCH (414a and 414b): Physical Uplink Control CHannel. The LTE uplink physical channel carrying uplink control information including Channel Quality Indicators (CQI), Hybrid Automatic Retransmission reQuest (HARQ) ACKnowledgment/Negative ACKnowledgment (ACK/NACK) and uplink scheduling requests related to communications between the eNB 402 and the UE. In some embodiments, in addition to its normal PUCCH, a UE is configured with an IDS-PUCCH (416a and 416b) for each inter-device session in which the UE participates in order to communicate IDS-related control and feedback information to the eNB. In some embodiments, as shown in FIG. 4A, a UE may also be configured with a control channel, IDS-CCH (e.g., IDS-TxCCH 424a and 424b and IDS-RxCCH 426a and 426b), allowing control and feedback information to be transmitted directly between UEs. The IDS-CCH may include IDS-RxCCH components or IDS-TxCCH components depending on the receiving and transmitting roles of each UE, and the configuration of the IDS. In other embodiments, IDS-related control and feedback information may be exchanged directly between UEs via IDS MAC control elements (CEs) that are transmitted along with data traffic (422a and 422b) over the allocated IDS resources.

In both FIGS. 4A and 4B, an RRC message 410a is transmitted from the eNB 402 to UE1 404a. The RRC message 410a can configure an IDS-SPS or IDS-PS resource allocation. An IDS-SPS allocation is one that is specified by the RRC message, and is then activated by a further message such as an specifically configured PDCCH DCI. An IDS-PS allocation is one that is completely specified by the RRC message and requires no further activation. The RRC message 410a may provide configuration information for one or more of: data traffic (422a and 422b), RS (418a and 418b) and IDS-CCH (IDS-TxCCH: 424a and 424b and IDS-RxCCH: 426a and 426b). The IDS-SPS resource allocation can be activated by a PDCCH DCI. Similarly, an RRC message 410b can be transmitted to UE2 404b that includes an IDS-SPS/IDS-PS resource allocation.

Figure 5A:
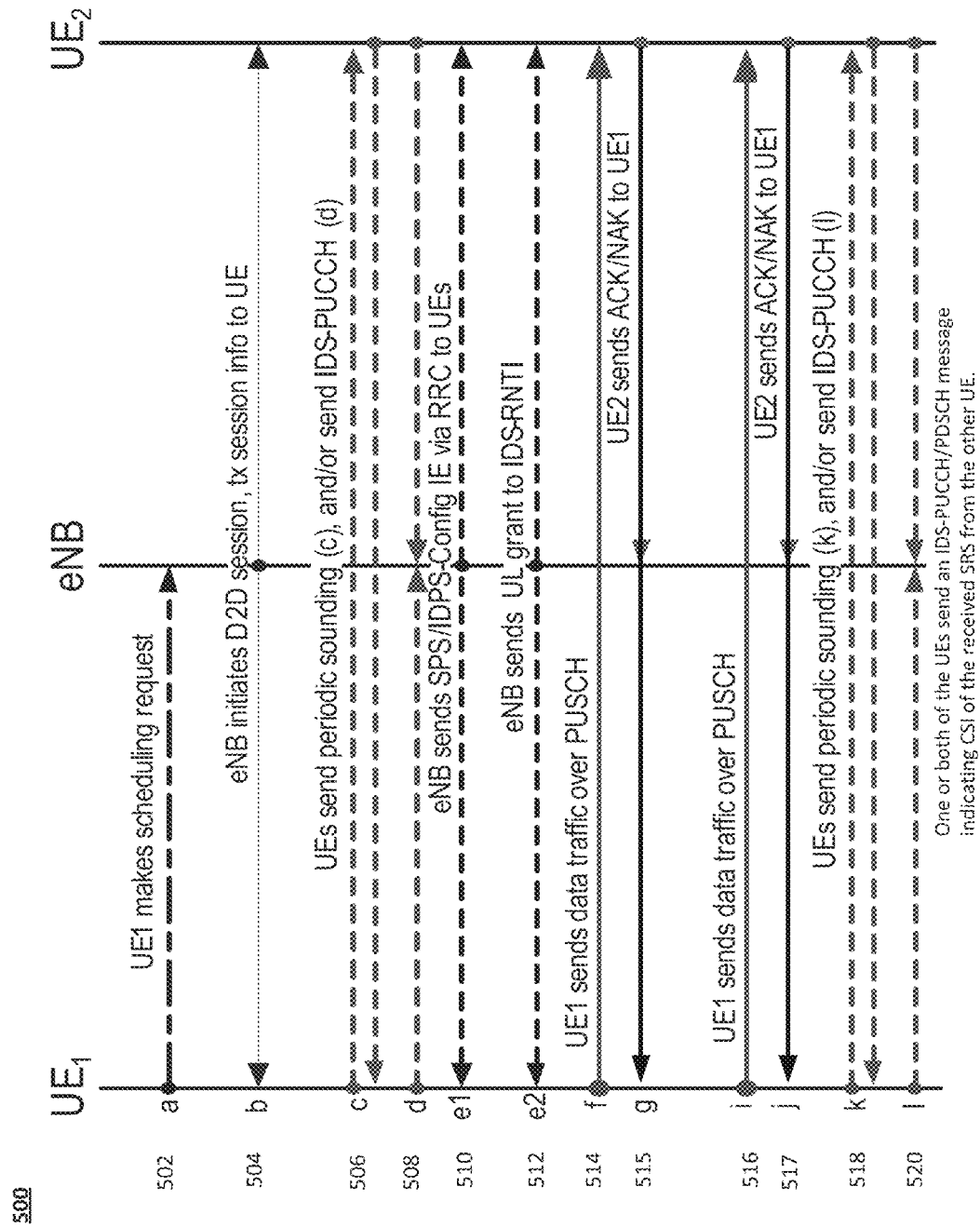
FIG. 5A is a message sequence diagram illustrating an example signal flow and traffic for an inter-device session in which a first UE receives feedback signaling directly from a second UE.

FIG. 5A is a message sequence diagram 500 illustrating example signal flow and traffic for an inter-device session. A first UE, referred to as UE1, may indicate to a network node that UE1 has data to send to a second UE, referred to as UE2 (502). This indication can be a radio link protocol indication or a scheduling request; however, it is the network that can choose whether or not to attempt a UE-to-UE session. The indication can also be a data packet destined for the network address assigned to UE2. It is understood that UE1 may want to send data to a single UE, UE2, or may want to send data to multiple UEs, such as in a multicast or broadcast session. Generally, the indication sent by UE1 and received by the network node indicates that UE1 wants to send data to at least UE2, and possibly other UEs. Other indications are also contemplated. For example, UE1 may not have a preference as to whether UE1 communicates in an inter-device session, or UE1 may specifically request an inter-device session. The network node may decide, based on network conditions, location of the UEs, operator policies, etc., whether or not the inter-device session is possible. If the network node determines that an inter-device session is possible, the eNB then sends information to start the session to each UE (504). For example, the eNB may send IDS-configuration information to the UEs. Such IDS-configuration information can include the reference signals to be transmitted and received to determine the proximity of the UEs and a radio network identifier for the IDS, which may be referred to as an IDS radio network temporary identifier (IDS-RNTI).

This disclosure describes multiple ways that an IDS-RNTI may be used in an inter-device session. A first example embodiment described herein includes an IDS-RNTI that may be referred to as a "session IDS-RNTI." A session IDS-RNTI is used when the same IDS-RNTI is shared by all UEs participating in the inter-device session. All UEs in the inter-device session may be able to detect and decode the same control messages transmitted in the PDCCH from the eNB. If the eNB uses a session IDS-RNTI, the eNB may also configure each UE in the IDS with a session UE-identifier (UE-ID) unique to each UE within the inter-device session. The UE-ID allows the eNB to identify each UE within the session and allows the UEs to identify each other as part of the inter-device session communications. In such a scenario, the control message may also include the UE-ID to indicate a particular UE associated with the control message. For example, if a UE receives a control message configured with the IDS-RNTI, the UE can check for the UE-ID to determine if the instruction indicates the UE's UE-ID or if the instruction indicates another UE's UE-ID.

A second example embodiment described herein includes IDS-RNTIs that may be referred to as "unidirectional IDS-RNTI" for each UE. For the unidirectional case, additional configuration information may be transmitted to the UEs. A unidirectional IDS-RNTI is used to indicate commands, messages, and/or feedback that are related to transmissions in one direction—from a first UE to a second UE, but not vice versa. Typically, but not necessarily, there will be two or more unidirectional IDS-RNTIs assigned for an inter-device session. For example, a first IDS-RNTI may be assigned to indicate transmissions from UE1, while a second IDS-RNTI may be assigned to indicate transmissions from UE2. The eNB may send control messages in the PDCCH configured with the unidirectional first IDS-RNTI to indicate transmission from UE1. All UEs in the inter-device session may be able to detect and decode the same control messages transmitted in the PDCCH from the eNB. The eNB may send other control messages in the PDCCH configured with the unidirectional second IDS-RNTI to indicate transmission from UE2. Note that the unidirectional IDS-RNTI for a transmitting UE may also be indicated to receiving UEs during configuration of the inter-device session. In some embodiments using the unidirectional IDS-RNTIs, a UE may be configured with two or more IDS-RNTIs (one or more that are specific for the IDS transmissions sent by the UE and other IDS-RNTIs used by other transmitting UEs from which IDS transmissions may be received).

The eNB communicates the IDS-RNTI (either session IDS-RNTI or unidirectional IDS-RNTIs) as IDS configuration information to a UE. The IDS configuration information may also include a dedicated supplemental PUCCH allocation (IDS-PUCCH) for IDS feedback or other IDS uplink requests to eNB. It should be understood that the IDS-PUCCH may be in addition to a PUCCH for conventional UE-eNB operations. In some embodiments, the IDS configuration may also include a dedicated control channel allocation (IDS-CCH) for communicating IDS control and feedback information directly between UEs. It should be understood that the IDS-CCH allocation may be in addition to the PUCCH and IDS-PUCCH allocations. In the embodiment with a session IDS-RNTI, the IDS configuration information may also include the UE-ID for a particular UE in the inter-device session.

In some embodiments, additional IDS configuration information may be sent, including a dedicated RNTI (TPC-IDS-RNTI) for power control commands sent by the eNB to a particular UE to control power of IDS transmissions. The IDS configuration may include periodic SRS configuration or other reference signal (RS) configurations specific to the IDS. IDS configuration information may also indicate an initial transmit power level for the IDS transmissions. Additionally, in some instances, the eNB will indicate how the UEs are to measure the signal strength from the other UE. In such cases, the eNB may include the other UE's session ID (within the existing UE-to-UE session), and RS location and configuration.

In some embodiments, on receiving configuration information from the eNB, one or more of the UEs involved in the session setup may transmit a reference signal (IDS-RS) or sounding reference signal (IDS-SRS) as directed by the eNB session setup commands. One or both of the UEs send a sounding reference signal (IDS-SRS) as indicated by the eNB session setup commands (506). The IDS-SRS is used by the other UE to determine whether they are in-range to communicate and, if they are, to determine receive timing window and channel state information (CSI). In some embodiments, the IDS-SRS is the same reference signal (SRS) used for sounding between the UE and the eNB; in other embodiments, the IDS-SRS is distinct from the SRS. In some implementations, one or both of the UEs send an IDS-PUCCH message to the eNB indicating CSI of the received IDS-SRS or PUCCH RS from the other UE (508). From this feedback, the eNB determines whether it is feasible to start UE-to-UE resource allocations.

The eNB sends an IDS-SPS-/IDS-PS-Config IE allocation for direct resources (510). The eNB sends an IDS-SPS-/IDS-PS-Config IE allocation for direct UE-to-UE communications. This IE may be unicast to each UE of the IDS or, in some embodiments, multicast to the UEs. In the case of the IDS-SPS allocation, the eNB activates the allocation for direct UL/DL UE-UE resources (IDS-PUSCH/PDSCH) using a PDCCH DCI configured with the inter-device session (IDS)-RNTI. Both (or all) UEs decode this message, which includes information on which UE is transmitting (UE1 in this example). In some embodiments, semi-persistent scheduling (SPS) assignment may be given to a direct UE-to-UE traffic channel. In these cases, the UEs may be configured by radio resource configuration (RRC) signalling to decode Downlink Control Information (DCI) configured by an IDS-SPS-RNTI related to the IDS-SPS assignment. The RRC information element, SPS-config, is sent by the eNB to all UEs of the UE-to-UE session; the information element may be included in an RRC message sent individually to each UE (i.e., using a PDSCH allocation configured with the C-RNTI assigned to the UE) or may be included in an RRC message multicast to all UEs in the IDS session (i.e., using a PDSCH allocation configured with the IDS-RNTI assigned to the session). The IDS-SPS assignment is activated by a transmission of a DCI configured by the SPS IDS-RNTI.

As a general example, the procedure to allocate the SPS by sending RRC signalling to each UE may include configuring two or more UEs with "IDS session setup messages," which may include or be included in an RRC message. Within the RRC message sent to each UE, the UEs are given a common IDS-RNTI to use for UE-to-UE communications within the session. If an IDS-SPS-Config information element is also included in the RRC message sent to each UE, then the SPS C-RNTI included in the information element is interpreted as an SPS-IDS-RNTI assigned to this IDS. At some time later, the eNB may send a DCI on a DL control channel (e.g., on the PDCCH/ePDCCH) configured by the SPS-IDS-RNTI of the session to indicate the start of an SPS allocation for the IDS and the UE session ID of the transmitting UE for this allocation.

In another general example, the procedure to allocate the SPS by multi-casting RRC signalling to each UE may include configuring two or more UEs with "IDS session setup messages," such as the RRC message. Within the RRC message sent to each UE, the UEs are given a common IDS-RNTI to use for UE-to-UE communications within the session. Sometime later, the IE SPS-Config is sent in an RRC message that is multicast to all of the IDS UEs. The RRC message is contained in a PDSCH assignment using a Format 1 DCI addressed to the IDS-RNTI of the session, so all UEs of the IDS will attempt to receive it. The SPS C-RNTI included in the information element is interpreted as an SPS-IDS-RNTI assigned to this IDS. As the RRC message is multi-cast, and because HARQ ACK/NAK is not implemented in LTE for multi-cast messages, one of the following mechanisms may be implemented: (i) the eNB may send the RRC message N times, and the UEs are configured to not send ACK/NAK responses to allocations addressed to IDS-RNTIs, or (ii) the UEs are configured only to send NAK if required, and the eNB retransmits the RRC message only if the eNB detects a NAK transmitted by at least one UE. At some time later, the eNB sends a DCI on a DL control channel (e.g., on the PDCCH/ePDCCH). The DCI is configured by the SPS-IDS-RNTI of the session. The DCI also indicates the UE session ID of the transmitting UE for this allocation.

In both instances, the UE identified by the UE session ID in the DCI is the designated transmitter in all of the subsequent transmission opportunities defined by the semi-persistent schedule until and unless another DCI addressed to the SPS-IDS-RNTI is included in the PDCCH.

In general for IDS-SPS operation, if the UE has been assigned a UE session ID within the IDS, then the DCI transmitted on a DL control channel may include the UE session ID to indicate the transmitter UE for the allocation. It may be noted that as the DCI contains the indication of transmitting UE, in some embodiments the transmitting UE may be changed via an additional DCI transmission for the same IDS-SPS allocation. Alternatively, the UE session ID may be included in each IDS-SPS RRC configuration sent to each UE of the IDS (unicast or multicast) to indicate the transmitting UE for the allocation when the UE session ID is activated.

Otherwise for IDS-SPS operation, if the UE has been not been assigned a UE session ID within the IDS (for example, an IDS-RNTI is assigned that is "unidirectional" such that the transmitter is implied), the IDS-RNTI may be included in each IDS-SPS RRC configuration sent to each UE of the IDS (unicast or multicast) to indicate the transmitting UE for the allocation when the IDS-RNTI is activated. In other embodiments, the unidirectional IDS-RNTI of the designated transmitter, rather than the UE session ID, is included in the DCI configured with the SPS-IDS-RNTI. Alternatively, the IDS may be configured such that the unidirectional IDS-RNTI and SPS-IDS-RNTI are the same so that further control messages relate to the IDS and the IDS-SPS allocation.

For operation in UL radio resources, SPS operation can be configured by the SPS-Config IE. In some embodiments, a new UL SPS-Config for inter-device sessions can be defined as the IDS-SPS-ConFIG. In some of these embodiments, the IDS-SPS can be defined to be used for the first HARQ transmissions of a packet only, such that the re-transmissions are explicitly scheduled. In some other embodiments, the SPS for inter-device session is defined for first HARQ transmissions and retransmissions. This configuration may be defined in specifications or indicated in the IDS-SPS-conFIG. For example, the IDS-SPS-config may have an explicit field that indicates whether or not the allocation can be used for re-transmissions. In another example, a specific value of one of the fields may indicate this configuration, such as setting the value of the implicit release timer to zero.

For operation in DL radio resources, there may be, for example, three embodiments. First, the SPS-Config for the UL may be re-used as the IDS-SPS-Config; however, the SPS-Config is modified to indicate allocation in the DL radio resources. In a second embodiment, the SPS-Config for the DL is re-used as the IDS-SPS-Config; however, in this embodiment, resources for retransmission in the DL need to be allocated separately as the DL SPS in LTE supports allocations for a first HARQ transmission only. This configuration may be defined in specifications or indicated in the IDS-SPS-config.

Finally, a modified SPS-Config IE is used as the IDS-SPS-Config for the DL that includes a toggle to allow retransmissions and implicit release timer fields. In the example of the modified SPS-Config as shown below, the toggle for allowing retransmission within the DL SPS is embedded in the implicit release timer.

Modified SPS-Config information element for IDS-SPS-Config

```
-- ASN1START
IDS-SPS-Config ::= SEQUENCE {
    IDS-semiPersistSchedC-RNTI      C-RNTI              OPTIONAL,       -- Need OR
    IDS-sps-ConfigDL                SPS-ConfigDL        OPTIONAL,       -- Need ON
    IDS-sps-ConfigUL                SPS-ConfigUL        OPTIONAL        -- Need ON
}
IDS-SPS-ConfigDL ::=    CHOICE{
    release                         NULL,
    setup                           SEQUENCE {
        semiPersistSchedIntervalDL      ENUMERATED {
                                            sf10, sf20, sf32, sf40, sf64, sf80,
                                            sf128, sf160, sf320, sf640, spare6,
                                            spare5, spare4, spare5, spare2,
                                            spare1},
        numberOfConfSPS-Processes       INTEGER (1..8),
        implicitReleaseAfter            ENUMERATED {e0, e2, e3, e4, e8, spare1, spare2,
spare3},
        n1PUCCH-AN-PersistentList       N1PUCCH-AN-PersistentList,
        ...,
        [[ twoAntennaPortActivated-r10  CHOICE {
            release                         NULL,
            setup                           SEQUENCE {
                n1PUCCH-AN-PersistentListP1-r10 N1PUCCH-AN-PersistentList
            }
        }                                                               OPTIONAL     -- Need
ON
        ]]
    }
}
IDS-SPS-ConfigUL ::=    CHOICE {
    release                         NULL,
    setup                           SEQUENCE {
        semiPersistSchedIntervalUL      ENUMERATED {
                                            sf10, sf20, sf32, sf40, sf64, sf80,
```

```
                                        sf128, sf160, sf320, sf640, spare6,
                                        spare5, spare4, spare3, spare2,
                                        spare1},
        implicitReleaseAfter            ENUMERATED {e2, e3, e4, e8},
        p0-Persistent                   SEQUENCE {
            p0-NominalPUSCH-Persistent      INTEGER (-126..24),
            p0-UE-PUSCH-Persistent          INTEGER (-8..7)
        }       OPTIONAL,                                   -- Need OP
        twoIntervalsConfig              ENUMERATED {true}   OPTIONAL,   -- Cond TDD
        ...
    }
}
N1PUCCH-AN-PersistentList ::=   SEQUENCE (SIZE (1..4)) OF INTEGER (0..2047)
-- ASN1STOP
```

Modified SPS-Config field descriptions (additonal to SPS-Config)

implicitReleaseAfter
Number of empty transmissions before implicit release. Value e2 corresponds to 2 transmissions, e3 corresponds
to 3 transmissions and so on. Value of e0 corrsponds to no implicit release and the first HARQ transmisisons only
(DL SPS only).

In the example of inter-device semi-persistent assignments IE (IDS-SPS-Config) illustrated, both the DL and UL semi-persistent assignments are indicated. In some embodiments, only one of these may be defined. For example, in a particular embodiment, the IDS-SPS-configUL can be used for semi-persistent assignment in either PUSCH or PDSCH radio resource regions.

In some embodiments, the ACK/NACK operation for IDS-SPS assignments may be sent to the eNB as described. In these embodiments, it may be desirable to configure the IDS-SPS resource for first HARQ transmissions of a packet only and explicitly allocate (via the PDCCH/ePDCCH DCI) the retransmissions.

In some other embodiments, IDS-SPS assignment may be configured such that the ACK/NACK responses are received directly by the transmitting UE over the IDS-RxCCH or in MAC CEs so that HARQ transmissions and retransmission may be sent in the IDS-SPS resources without eNB allocations or ACK/NACK indications by the eNB to the D2D transmissions.

In still further embodiments, the system may operate without HARQ, and transmissions are repeated until a maximum number is reached. In some cases, the maximum number may be specified in the RRC configuration messages sent to the UEs, while in other cases it may be defined in the specifications.

In some embodiments where a transmitting UE may adjust the MCS of the IDS transmission, the transmitting UE may indicate the MCS change or new MCS via the IDS-TxCCH or via an IDS-MAC CE, where the IDS-MAC CE is sent over IDS resources.

In addition to the semi-persistent allocation described above, the inter-device session may also operate using persistent allocation. In persistent allocation embodiment, the allocation is made by RRC signalling only and does not require activation via a DCI. In some embodiments, the RRC signalling for persistent scheduling of IDS resources needs to include additional parameters of the transmission format, as well as an indication of the UE that will be transmitting. In other embodiments, this information is exchanged directly between UEs via the IDS-CCH or via IDS MAC CEs. As in the description of the SPS assignment, the signalling of IDS-PS-Config may be sent to each UE separately, or multi-cast to UEs of the session using the IDS-RNTI.

In general for IDS-PS operation, if the UE has been assigned a UE session ID within the IDS, the UE session ID may be included in each IDS-PS RRC configuration sent to each UE of the IDS (unicast or multicast) to indicate the transmitting UE for the allocation. Otherwise for IDS-PS operation, if the UE has been not been assigned a UE session ID within the IDS (for example, an IDS-RNTI is assigned that is "unidirectional" such that the transmitter is implied), the IDS-RNTI may be included in each IDS-PS RRC configuration sent to each UE of the IDS (unicast or multicast) to indicate the transmitting UE for the allocation. In other embodiments, the role of transmitting UE is determined via signalling over the IDS-CCH or via the exchange of IDS MAC control elements (CEs) over the allocated IDS resources. An example of an inter-device persistent assignment IE (IDS-PS-Config) is illustrated below for both the DL and UL persistent assignments. In some embodiments, only one of these may be defined. For example, in a specific embodiment, the IDS-PS-configUL can be used for persistent assignment in either PUSCH or PDSCH radio resource regions.

IDS-PS-Config information element

```
-- ASN1START
IDS-PS-Config ::=   SEQUENCE {
    IDS-PersistSchedC-RNTI      C-RNTI          OPTIONAL,       -- Need OR
    IDS-PS-ConfigDL             IDS-ConfigUL    OPTIONAL        -- Need ON
    IDS-PS-ConfigUL             IDS-ConfigUL    OPTIONAL        -- Need ON
}
IDS-PS-ConfigDL ::= CHOICE{
    release                     NULL,
    setup                       SEQUENCE {
        semiPersistSchedIntervalDL      ENUMERATED {
                                            sf10, sf20, sf32, sf40, sf64, sf80,
```

```
                                            sf128, sf160, sf320, sf640, spare6,
                                            spare5, spare4, spare3, spare2,
                                            spare1},
        numberOfConfSPS-Processes           INTEGER (1..8),
        dataMCS                             ENUMERATED {n0, n1, n2... n31}
        sessionUEID                         INTEGER ( )
        implicitReleaseAfter                ENUMERATED {e0, e2, e3, e4, e8, spare1, spare2,
spare3},
        n1PUCCH-AN-PersistentList           N1PUCCH-AN-PersistentList,
        ...,
        [[ twoAntennaPortActivated-r10      CHOICE {
            release                             NULL,
            setup                               SEQUENCE {
                n1PUCCH-AN-PersistentListP1-r10 N1PUCCH-AN-PersistentList
            }
        }                                                                   OPTIONAL    -- Need
ON
        ]]
    }
}
IDS-PS-ConfigUL ::= CHOICE {
    release                             NULL,
    setup                               SEQUENCE {
        semiPersistSchedIntervalUL          ENUMERATED {
                                                sf10, sf20, sf32, sf40, sf64, sf80,
                                                sf128, sf160, sf320, sf640, spare6,
                                                spare5, spare4, spare3, spare2,
                                                spare1},
        implicitReleaseAfter                ENUMERATED {e2, e3, e4, e8},
        dataMCS                             ENUMERATED {n0, n1, n2... n31}
        sessionUEID                         INTEGER   ( )
        p0-Persistent                       SEQUENCE {
            p0-NominalPUSCH-Persistent          INTEGER (-126..24),
            p0-UE-PUSCH-Persistent              INTEGER (-8..7)
        }       OPTIONAL,                                           -- Need OP
        twoIntervalsConfig                  ENUMERATED {true}       OPTIONAL,   -- Cond TDD
        ...
    }
}
N1PUCCH-AN-PersistentList ::=       SEQUENCE (SIZE (1..4)) OF INTEGER (0..2047)
-- ASN1STOP
                        IDS-PS-Config field descriptions (additonal to IDS-SPS-Config)
```

DataMCS
Indicates the Modulation and Coding Scheme (MCS) applicable for the allocation Value n2 corresponds with the value 2 for parameter $I_{MCS}$ in TS 36.213 [23, Table 7.1.7.1-1], and so on.
SessionUEID
Indicates the UE sessionID of the transmiting UE on the IDS-PS resources as assigned in the IDS-Config.

In addition, in some cases, a common start time may need to be indicated to the UEs so that each UE is aware of when the persistent configuration begins. This is not needed in all cases, as the time for initiation may be as soon as the first IDS-PS-Config is sent. In other embodiments, frame number field (e.g., startFrameNumber (integer)) may be included to indicate on which frame the allocation will begin.

In some embodiments, the ACK/NACK operation for IDS-PS may be sent to the eNB as described. In these embodiments, it may be desirable to configure the IDS-PS resource for first transmissions only and explicitly allocate (via the PDCCH/ePDCCH DCI) the retransmissions.

In some other embodiments, IDS-PS assignment may be configured such that the ACK/NACK responses are received directly by the transmitting UE over the IDS-RxCCH or in IDS MAC CEs so that HARQ transmissions and retransmission may be sent in the IDS-PS resources without eNB allocations or ACK/NACK indications by the eNB to the D2D transmissions.

In still further embodiments, the system may operate without HARQ and transmissions are repeated until a maximum number is reached.

In some embodiments where a transmitting UE may adjust the MCS of the IDS transmission, the transmitting UE may indicate the MCS change or new MCS via the IDS-TxCCH or via an IDS-MAC CE, where the IDS-MAC CE is sent over direct device-to-device resources.

In non-D2D scenarios, a PUSCH transmission is scrambled by a Gold sequence initialized by:

$$c_{init} = n_{RNTI} \cdot 2^{14} + q \cdot 2^{13} + \lfloor n_s/2 \rfloor \cdot 2^9 + N_{ID}^{cell}$$

where $n_{RNTI}$ is the UE C-RNTI or SPS RNTI, and $N_{ID}^{cell}$ is the cell ID.

For direct UE-to-UE transmission on PUSCH, the transmission is scrambled by the IDS-RNTI of the UE-to-UE session or the IDS-SPS (or IDS-PS) RNTI, whichever is indicated by the encoding of the PDCCH DCI carrying the UL grant, and by the cell ID of the controlling eNB.

In the PDSCH, in some embodiments, the UE-to-UE communications use the same scrambling as indicated for the PUSCH as UL procedures are used for UE-to-UE communication in either the UL or DL resources.

In an alternate embodiment, UE-to-UE transmissions in the PDSCH use scrambling based on LTE PDSCH scrambling, where in LTE PDSCH operation, a transmission is scrambled by a Gold sequence initialized by:

$$c_{init} = n_{RNTI} \cdot 2^{14} + q \cdot 2^{13} + \lfloor n_s/2 \rfloor \cdot 2^9 + N_{ID}^{cell} \text{ for PDSCH}$$

where $n_{RNTI}$ is the UE C-RNTI or SPS RNTI, and $N_{ID}^{cell}$ is the cell ID.

For direct UE-to-UE transmission on PDSCH and regardless of whether LTE PDSCH-based or PUSCH-based scrambling is used, the transmission is scrambled by the IDS-RNTI of the UE-to-UE session or the IDS-SPS-RNTI (or IDS-PS-RNTI), whichever is indicated by the encoding of the PDCCH DCI carrying the DL allocation grant, and by the cell ID of the controlling eNB.

Depending on the availability of reliable feedback at the eNB, the IDS-PUSCH/PDSCH transmission may be adapted via a modulation and coding scheme (MCS) based on channel conditions and available transmit power at the UEs. In some embodiments, the determination of MCS is made by the eNB using UE's feedback of CQI. CQI measurements may be made on the IDS-PUCCH, PUCCH or other RS transmissions. CQI feedback may be provided either via the IDS-PUCCH, if there is only one transmitter in the session, or via a MAC control element, if there are one or more transmitters in the session. In the case where reliable feedback is not available, the eNB may use the most reliable MCS available as a default selection.

In some implementations of the embodiments of a UE receiving the other UE(s) IDS-PUCCH information, a UE may change its transmission power level for the inter-device session based in part on either the received signal level (i.e., assuming a reciprocal channel) or explicit CQI level indicated in the IDS-PUCCH.

In some embodiments where a transmitting UE may make the decision to adjust the MCS of the UE-to-UE transmission, the transmitting UE may directly indicate the MCS change or new MCS via the IDS-TxCCH or via an IDS-MAC CE.

Returning to FIGS. 5A and 5B, the IDS-RS/SRS transmission may be used by the other UEs to determine whether they are in-range to communicate and, if they are, to determine receive timing window and channel state information (CSI). In some embodiments, these IDS-RS/SRS transmissions may be the same as RS/SRS used for conventional channel sounding between the UE and eNB. If used, the configuration of the (IDS-)SRS/RS assigned to one UE of the attempted UE-to-UE session is given to the other UE. In this manner, the UEs may determine if there is sufficient signal strength received from the other UE. This information is transmitted to the eNB on the IDS-PUCCH assigned to a UE. In some embodiments, if sufficient signal strength is received from the other UE, and both UEs communicate this information to the eNB, then the inter-device session may proceed. During the inter-device session, the IDS-SRS/RS, if assigned, may be used for, among other things, timing alignment, which may include receive window alignment by the receiving UE, timing advance adjustment by the eNB to adjust transmission timing and CQI estimation by the receiving UE. In some embodiments, the UE may use MAC control elements to indicate CQI per transmitter. Signaling to the eNB using MAC control elements may be particularly useful in cases where multiple possible transmitters are defined in the session for a given receiving UE. In another embodiment, signal quality and timing information is derived from the reference signals associated with the PUCCH or IDS-PUCCH of the other UE.

An IDS specific PUCCH may be assigned to each UE for communicating information to the eNB regarding the inter-device session channel. This assignment may be a new PUCCH allocation in addition to a conventional PUCCH allocation for UE-to-eNB-feedback, or the assignment may be a replacement of the conventional PUCCH with IDS-PUCCH, or the assignment may be a replacement of one or more periodic occurrences of the conventional allocated PUCCH (for example, the IDS-PUCCH replaces the PUCCH every $n^{th}$ occurrence). Similarly, an IDS-CCH may be assigned for communicating control and feedback information directly between UEs in an IDS.

UE1 may send an IDS-PUCCH message to the eNB indicating CSI of the received SRS, or PUCCH RS or other reference signal from the other UE. From this feedback, the eNB determines whether it is feasible to start IDS resource allocations.

Then, eNB sends an activation for the IDS-SPS allocation for IDS resources using a PDCCH DCI configured with the inter-device session (IDS) SPS RNTI (512). IDS resources for direct UE-to-UE transmission are allocated via grants contained in the PDCCH, ePDCCH or other DL control channels. A resource allocation configured with the IDS-RNTI is sent in a DL control channel (for example, the PDCCH region of the subframe) using downlink control information (DCI) formats. For example, if a session IDS-RNTI is used, this allocation uses a Format 0 or 4 DCI with one additional field to indicate the transmitter granted use of the resources; the transmitter is identified by the session UE-identifier (UE-ID) provided to the UE by the eNB in the session setup message. The additional field is not required, however, for IDS-RNTIs defined for the transmitter (e.g., unidirectional IDS-RNTI). The other UE(s) configured to use the IDS-RNTI are implicitly assigned the role of receiver for this resource allocation. The timing of the UE transmission using the indicated IDS resources is relative to the grant transmission and is derived by the UEs from the timing of the grant and the network configuration.

Using the resources indicated by (510), UE1 transmits a data message to UE2 using the designated IDS-PUSCH/PDSCH resources (514). UE2 can send a HARQ ACK/NACK response regarding the received UE-to-UE transmission (515). For example, a NAK can be sent indicating the transmission was not successfully received.

In the above process of transmission, HARQ ACK/NACK feedback along with periodic sounding is continued until the session is explicitly terminated is by the eNB or the allocation is implicitly released according the SPS configuration parameters. It should be noted that while CQI from the UE and allocation indication from the eNB are not necessary for each transmission, the eNB may provide change or adapt the allocation by sending an IDS configured PDCCH/ePDCCH DCI, or further send TPC messages to the transmitting UE. Alternatively, the transmitting UE may receive this information directly from the receiving UE via the IDS-RxCCH or via IDS MAC CEs.

In the above process, the UE2 sends feedback related to the IDS channel and IDS transmissions. This feedback could include CQI/CSI, ACK/NACK, scheduling request or other uplink control information. In some cases, one or more of these information elements can be sent in the same message such as an IDS-PUCCH. In other cases, the IDS-PUCCH resources for feedback may be derived from related parameters of the IDS transmission and/or assignment for the purpose of at least NACK/ACK. In some of these implementations, UE1 is configured to receive at least the ACK/NACK feedback from UE2 over the IDS-RxCCH, while the eNB may also receive some or all of the feedback from UE2 over the IDS-PUCCH. The feedback to the eNB and UE1 may be separate messages, or the same message received by both. In some cases, the eNB may ignore the information it receives on the IDS-RxCCH as UE1 is making decisions based on the IDS-RxCCH information it receives. In other embodiments, control and feedback information is exchanged directly between UEs via IDS MAC control elements (CEs) transmitted over the allocated IDS resources.

In some embodiments in this section, a 1 or 2-bit packet cyclic ID is included by the transmitting UE in the IDS-PUSCH/-PDSCH message to combat ACK/NACK errors or loss of one or more IDS-PUCCH or IDS-RxCCH transmissions. In some embodiments, this indication is sent concurrently with the packet transmission (for example, in a packet header or IDS-TxCCH), while in some other embodiments, the indication may be sent in advance of the next of next transmission (for example, on an IDS-PUCCH transmission). This value is incremented by one with every new packet transmission, so that a receiving UE may recover quickly in case of ACK/NACK error or missed IDS-PUCCH or IDS-RxCCH transmissions. In proper operation, the transmitting UE will increment the ID every time the transmitting UE receives an ACK and will, therefore, provide the receiving UE with an indication of a new packet transmission. The behavior of the receiving UE with a 1-bit ID is indicated in Table 3.

TABLE 3

UL HARQ Operation for UE-UE IDS-SPS Autonomous Mode with 1-bit cyclic packet ID at Receiving UE

| HARQ feedback sent by the receiving UE | Next packet ID seen by the receiving UE | Receiving UE behaviour |
| --- | --- | --- |
| NACK | Incremented | Assume new transmission; clear buffer and start processing new packet (possible missed IDS PUCCH/IDS RxCCH or ACK/NAK error) |
| ACK | Incremented | New transmission as expected; clear buffer and start processing new packet |
| NACK | Not-incremented | Retransmission as expected |
| ACK | Not-incremented | Retransmission assumed. Discard as packet transmission already received correctly. |

In a two bit or larger cyclic packet ID field, one or more values may be reserved to convey additional information. For example, one value of a 2-bit field may be reserved to indicate that the transmitting UE will not be transmitting more data during the next resource opportunity. If this indication is received, the receiving UE will monitor further SPS opportunities in the IDS-PUSCH until the value is incremented. In another example, one value of the 2-bit field may be reserved to indicate that the transmitting UE is relinquishing its transmitter role in the next SPS opportunity, allowing the receiving UE to assume the transmitter role in that next opportunity.

Using the IDS-SPS/IDS-PS allocation, UE1 can transmit the message to UE2 using the designated IDS-PUSCH/PDSCH resources (516). For example, if a NACK is received by UE1, the UE1 can retransmit the data. Or, if an ACK is received by UE1, UE1 can send another packet. UE2 sends a HARQ ACK/NACK response regarding the last received UE-to-UE transmission (517). For example, an ACK can be sent indicating the transmission was successfully received.

Depending on the configuration assigned by the eNB, one or both of the UEs send reference signals (RS) (e.g., a sounding reference signal (SRS)) as indicated by the eNB session setup commands (518). The transmissions of SRS/RS can continue until the session is terminated. One or both of the UEs send an IDS-PUCCH/PDSCH message indicating CSI of the received SRS/RS from the other UE (520).

Figure 5B:
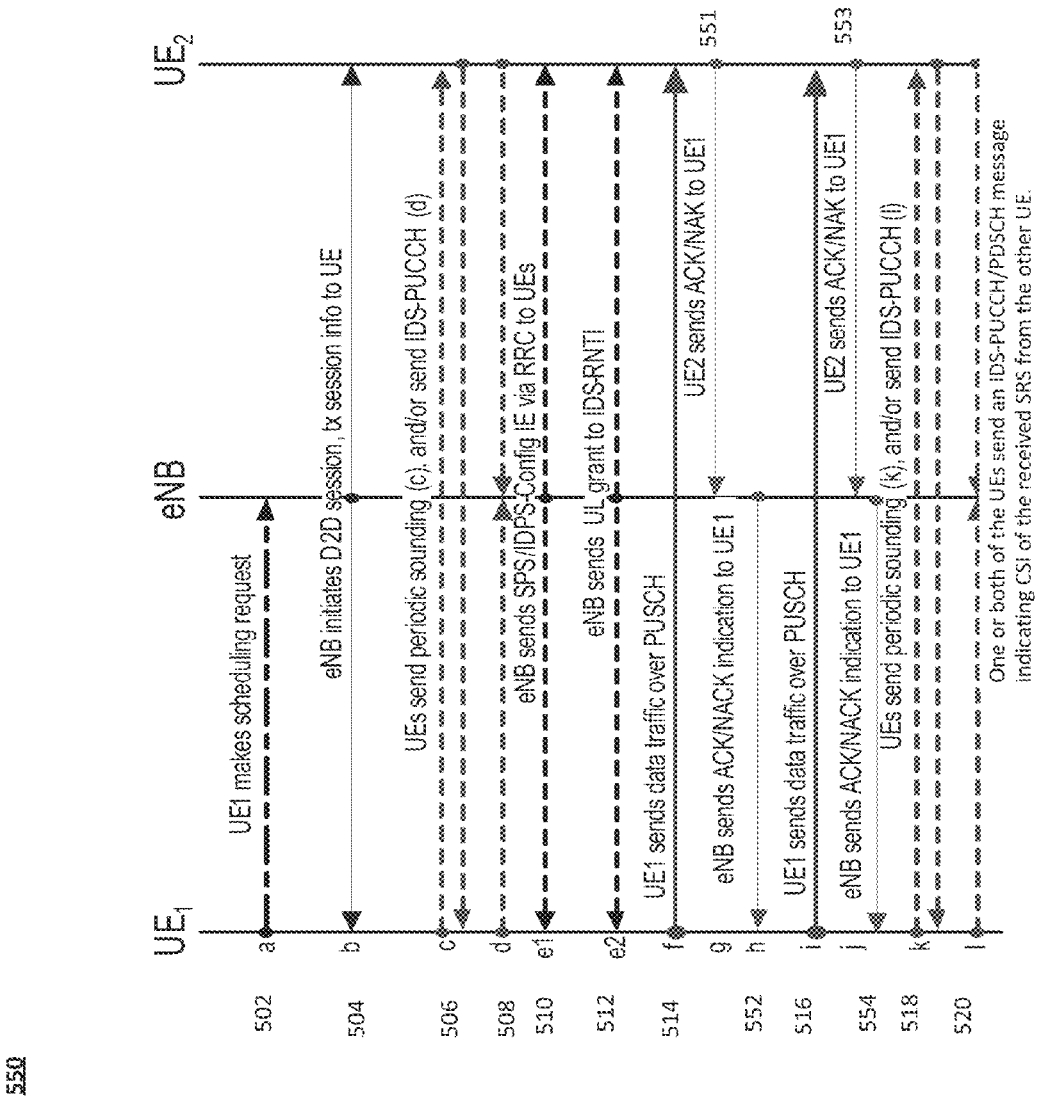
FIG. 5B is a message sequence diagram illustrating an example signal flow and traffic for an inter-device session in which feedback signaling is transmitted to a network node (e.g., an evolved Node B (eNB)).

FIG. 5B is a message sequence diagram 550 illustrating an example signal flow and traffic for an inter-device session in which feedback signaling is transmitted to a network node (e.g., an evolved Node B (eNB)). The procedures illustrated in sequence diagram 550 are the same as those illustrated above for FIG. 5A, with the exception that after UE1 sends data traffic over PUSCH (514), UE2 sends ACK/NACK (and/or other feedback signaling) to the eNB (551). The eNB can send an ACK/NACK indication to UE1 (552). Similarly, after UE1 sends data traffic to UE2 over PUSCH (516), UE2 sends ACK/NACK (and/or other feedback signaling) to the eNB (553). The eNB can send an ACK/NACK indication to UE1 (554).

In addition to the configured replacement of the PUCCH by the IDS-PUCCH described, the eNB may allocate different resources for the IDS-PUCCH, for example, through the cqi-PUCCH-ResourceIndex in the CQI-ReportConfig IE, or allocate different periodicities or subframes to differentiate the IDS-PUCCH and PUCCH transmission received at the eNB. In some of these embodiments, the C-RNTI of the UE is used to scramble the PUCCH UCI format 2/2a/2b/3, or other control signalling formats scrambled by an RNTI, when used. In some embodiments, the IDS-RNTI is used to scramble IDS-PUCCH UCI format 2/2a/2b/3, or other control signalling formats scrambled by an RNTI, when used. Scrambling by IDS-RNTI may be useful to differentiate the IDS-PUCCH transmissions from the PUCCH transmission, and this may enable the UE to selectively transmit either one in a given PUCCH allocation. Other UEs in the inter-device session may make use of reference signals of the PUCCH and/or IDS-PUCCH transmissions for CQI and timing information.

The IDS-PUCCH transmission may have the same functionality and format as the conventional PUCCH, except that its contents (CSI, CQI, ACK, SR, etc.) pertain to the IDS channel and IDS transmissions. The function of the IDS PUCCH is to provide feedback on IDS communications. In aspects of this embodiment, a first UE can be configured to receive feedback from a second UE, in response to an IDS direct transmission from the first UE to the second UE. In some cases, the first UE can be configured to receive at least the ACK/NACK feedback so that the first UE can determine if further retransmissions of the packet are needed. The eNB is also able to receive feedback, such as information related to channel conditions or channel state information, or scheduling requests, on the IDS-PUCCH. In some embodiments, feedback may be given for the transmitting UE when there are more than two UEs in the inter-device session but there is only one transmitting UE. In another embodiment, a UE may determine the worst CQI of multiple transmitters (by receiving and measuring other UEs signals) and report that to the eNB as the CQI of the inter-device session to reduce CQI signalling. The IDS PUCCH can be used for other functions including sending IDS HARQ ACK/NACK responses to UE-to-UE packets to be received by the other UE, making scheduling requests to the eNB (e.g., so that the requesting UE may be assigned IDS transmission resources), and in some cases providing a UL reference signal for the other UEs to measure for making CQI/timing measurements. The IDS-PUCCH message may be configured by LTE PUCCH format 1/1a/1b or format 3 when CSI is not included, and format 2, LTE PUCCH format 2a or LTE PUCCH format 2b when CSI is included.

For IDS-related ACK/NACK transmission, the UE may use the UE-specific assigned IDS-PUCCH resources for transmission of a message configured as LTE PUCCH format 2a or LTE PUCCH format 2b type transmissions, and in cases of extended cyclic prefix, Format 2. The IDS-related ACK/NACK transmissions may also be sent on IDS-PUCCH configured resources for LTE PUCCH format 1a or LTE PUCCH format 1b type message configurations. In some embodiments for IDS-PUCCH messages configured as LTE PUCCH format 1a or LTE PUCCH format 1b, a resource of the IDS-PUCCH transmission to the eNB can be derived from a mapping of an index of a control channel element (CCE) used to send a PDCCH DCI IDS allocation to the designated transmitter in an inter-device session.

Format 1a/1b is a scheme in LTE, in which ACK/NACK is sent according to a mapping of downlink resources. The ACK/NACK feedback is sent on the PUCCH (or IDS-PUCCH) based on the mapping of downlink control message resources (i.e., the ACK/NACK feedback resource is not UE-specific or pre-assigned for a particular UE, but instead is simply determined based upon the downlink control message transmission). For IDS-SPS allocations, the resources location for IDS-SPS is signaled in the ASN as described in this embodiment, and hence further multiplexing is not required.

Format 2a/2b is a scheme in LTE in which the ACK/NACK feedback is sent on a PUCCH resource that is assigned to a particular UE. Format 2a/2b is typically used for CQI reporting, but it is possible to include ACK/NACK feedback with the CQI. Format 2 is used for extended cyclic prefix configurations, or reporting without ACK/NACK feedback in UE-assigned resources.

Format 3 is a scheme in LTE for sending a large number of ACK/NACK bits. The ACK/NACK feedback is scrambled by the C-RNTI of the UE providing the feedback such that the eNB, and other UE if configured to do so, can determine which UE is providing the feedback.

In some embodiments, the resources assigned to a UE for IDS-PUCCH transmissions (e.g., LTE Format 2, 2a or 2b) and/or the resources allocated for IDS-related ACK/NACK responses without CQI (e.g., LTE Format 1a or 1b) may be different from the resources assigned for non-IDS PUCCH transmissions.

In further embodiments, the resources assigned for UE-to-UE feedback containing at least ACK/NACK IDS feedback are different than resources used for IDS-PUCCH feedback intended to be received by the eNB. For example, the set of resources for UE-to-UE ACK/NACK transmissions in LTE IDS-PUCCH 1a/1b is different than the set of resources assigned for IDS-PUCCH feedback messages to the eNB, which may include IDS-related CSI, SR, and in some embodiments IDS ACK/NACK, and other non-IDS-PUCCH messages.

With regard to ACK/NACK feedback, it should be understood that the above mentioned feedback formats used in conventional PUCCH operation may be applied to the feedback regarding the IDS transmissions. The ACK/NACK feedback describes the feedback regarding the IDS transmission, but is provided by the receiving UE to another UE. With regard to RS/SRS operations described above, the operation is used by the UEs to measure the channel and provide feedback to the eNB regarding the channel between the UEs. This may be instead of, in addition to, or replaced by the standard PUCCH SRS or RS transmission if present. In embodiments where the IDS-PUCCH may be used for the CQI measurement of the UE-to-UE channel, the CQI estimate may be approximate as the IDS-PUCCH may be transmitted on the band edges. In this configuration, the IDS-PUCCH CQI estimate may not be a valid estimate of the sub-band CQI.

As described above, following the transmission of a data packet from a transmitting UE to a receiving UE, the receiving UE may send a HARQ positive (ACK) or negative (NACK) acknowledgement to the eNB using the IDS-PUCCH allocated to the receiving UE for this IDS. In some embodiments, if the eNB receives a NACK from any of the receiving UEs regarding the transmission, no signalling to the transmitting UE is required, and the transmitting UE will make a non-adaptive re-transmission in the same resource indicated by the initial PDCCH DCI grant for the previous transmission. In some embodiments, the eNB will signal a NACK to the transmitting UE in the PHICH although the absence of the transmission implies a NACK.

If the eNB receives an ACK regarding the UE-to-UE transmission from all of the receiving UEs, the eNB can transmit an ACK via the PHICH according to ACK/NACK transmission procedures for synchronous HARQ on the uplink. In addition, if IDS-PUSCH/PDSCH allocation is received by the transmitting UE in a PDCCH DCI that is configured by the IDS-RNTI, the new data indicator (NDI) in the PDCCH DCI will indicate whether the IDS-PUSCH/PDSCH allocation is for a retransmission or transmission of a new packet.

| UL HARQ Operation | | |
|---|---|---|
| HARQ feedback seen by the UE | PDCCH DCI seen by the UE | UE behaviour |
| ACK or NACK | NDI = 1 | New transmission according to PDCCH DCI |
| ACK or NACK | NDI = 0 | Retransmission according to PDCCH DCI (adaptive retransmission) |
| ACK | None | No transmission, keep data in HARQ buffer and a PDDCH UL grant is required to initiate transmissions of new data |
| NACK | None | Non-adaptive retransmission |

In cases where multiple inter-device sessions are assigned the UL resources for transmission, the eNB may use appropriate scheduling rules to ensure the ACK/NACK responses in the PHICH will be separable. For example, the eNB may ensure that cyclic a shift for the demodulation reference signal (DMRS) field (according to Table 9.1.2-2, of 3GPP TS 36.213 v.10.3.0) in the PDCCH DCI uplink grant for each IDS-PUSCH transport block are different or, at least, are selected such that they do not map to the same resources and orthogonal code sequence index.

In some embodiments, including the ACK/NACK response implicitly via the NDI in a new PDCCH/ePDCCH DCI UL grant is a more efficient mechanism of delivering ACK/NACK information to the transmitting UE; therefore, the session may be configured such that a UE waits until receiving another PDCCH/ePDCCH DCI allocation with NDI in order to determine where an ACK/NACK response was received. In further embodiments, the transmitting UE takes no actions until another PDCCH/ePDCCH DCI with NDI is received.

The ACK/NACK feedback from each of the receiving UEs to the eNB is carried on the respective IDS-PUCCH or the PUSCH/PDSCH region according to procedures for a HARQ-ACK of a downlink transmission as given by of 3GPP TS 36.213 v.10.3.0. The multiplexing of ACK/NACK for DL transmissions can be largely reused, for example:

PUCCH UCI Format 1a/1b. In LTE, of 3GPP TS 36.213 v.10.3.0 the ACK/NACK resource locations are linked to the location of the lowest CCE of the PDCCH allocation used for the DL transmission resource allocation. For IDS-SPS allocations, the resource location for IDS-SPS is signalled in the ASN. In embodiments described, the PDCCH/ePDCCH UL grant location may be linked resources used for ACK/NAK transmission to the eNB in a similar manner, while it is noted that the UL grant is sent n subframes prior to the D2D transmission. In some embodiments, the resources for D2D ACK/NACK transmission may be collocated with resources for DL transmissions, while in other embodiments, the resources for D2D ACK/NACK transmission may be located in different time-frequency resources, in addition to those for DL transmissions. For IDS-SPS allocations, the resources location for IDS-SPS is signalled in the ASN as described in this embodiment, and hence further multiplexing is not required.

Format 2a/2b/3. In these cases, the PUCCH UCI is distinguished by scrambling using the C-RNTI in LTE systems. In this embodiment, the PUCCH may be scrambled by either the C-RNTI of the UE, or the IDS-RNTI of session depending on the configuration.

It can be noted that in the case where the eNB or network assigns multiple D2D sessions on the same resource, each with different RNTI, the ACK/NACK responses in a UE-to-UE session will be separable at the eNB (or receiving UE) by:

1. In the case of UCI format 1a/b, the location of the lowest CCE used for transmission of the UL grants for each IDS-RNTI transmission will be different, hence leading to mapping to different resources for ACK/NACK transmission.
2. In the case of an IDS-SPS assignment, the location of the ACK/NACK transmission is assigned by the eNB and, therefore, can be different for each session if Format 1a/1b is used.
3. In the case of UCI Format 2a/2b/3, the IDS-RNTI or the C-RNTI, whichever is used, of each transmission is different so that the scrambling of each PUCCH transmission will be different. In addition, for format 2a/2b different resources may be assigned to different UEs for IDS-PUCCH CQI feedback according to the cqi-ReportConfig.

It may also be noted that the information for the location of the ACK/NACK response which includes UL grant location and IDS-RNTI (if used) are known at both the UE session receiver and transmitter. Further, PHY ACK/NACK multiplexing design options are also possible but are beyond the scope of this document.

The physical location of the ACK/NACK channel from the eNB to the transmitting UE is on the PHICH channel for ACK/NACK responses to an uplink transmission, and/or implicitly indicated by the presence of another PDCCH/ePDCCH DCI grant with NDI.

In other embodiments, the allocation by the PDCCH for the UL resources may be asynchronous (i.e., a PDCCH UL grant is required for each HARQ retransmission). In these embodiments, the HARQ procedure to be used—either synchronous or asynchronous—is signalled to a UE by the eNB in an RRC message, or may be configured in a specification.

In the embodiments described herein, the ACK/NACK is sent to the eNB on the PUCCH from the receiving UE of the D2D session, and then sent to the transmitting UE via the PHICH, and/or implicitly through the presence of a PDCCH/ePDCCH DCI with NDI. The main purpose of sending the ACK/NACK through the eNB is to allow the eNB to allocate resources for each transmission. This is most useful in the case of dynamic scheduling, where the eNB needs to know whether the packet transmission is complete (and hence the UL synchronous resources may be released), or whether a re-transmission or new first HARQ transmission is needed (and hence the eNB may allocate a new or the same set of resources). If the NACK/ACK was not readable by the eNB, then it may be difficult for the eNB to allocate resources. Further, if the ACK/NACK was sent with the expectation that both the other UE and eNB would read it, there is potential for error at one location—which may lead to the eNB allocating resources that are unused, or a UE transmitting without a valid allocation.

In some other embodiments, it can be noted that if IDS-SPS allocation is used for first HARQ transmissions only, it is also useful for the ACK/NACK transmissions to go to the eNB so that the eNB knows to schedule resources for retransmissions outside the IDS-SPS resource as needed.

The process for HARQ transmissions within PUSCH is described above. In some embodiments, the transmission of data over PUSCH may occur without specific HARQ acknowledgements. In these cases, a packet may be transmitted one or more times according to a pre-determined configuration. The predetermined number of times a packet is re-transmitted may be configured during a session set-up message, or the number may be known through another predefined configuration such as standardization.

The receiver does not transmit positive or negative acknowledges during or after a packet transmission. If the packet is not received successfully after the configured number of transmissions of a packet, the error is handled by higher layers of the system (e.g., ARQ).

This embodiment may be used in any UE-to-UE session described in this disclosure. This embodiment may be particularly useful in multicast broadcast scenarios as there are multiple receivers and managing re-transmission may be difficult and costly in signaling. In addition, this scheme may be useful for cases where the eNB does not control re-transmissions as in the UE autonomous mode.

In still further embodiments, transmitting ACK/NACK to the eNB is not as useful in the longer term allocation cases (semi-persistent with retransmissions, or persistent scheduling) as the continuance of the allocation does not depend on the completing of HARQ packet transmissions. In these cases, the same ACK/NACK message from the UE can be used; however, the ACK/NACK message can be read by the other UE. The eNB does not need to receive the ACK/NACK responses in these cases. Therefore, as described herein, the ACK/NACK for some IDS-SPS and persistent assignments may be configured such that the ACK/NACK responses are received directly by the other UE as described in the embodiments, or in other cases, the system may operate without HARQ, and retransmission continue until a maximum number is reached.

Figure 9:
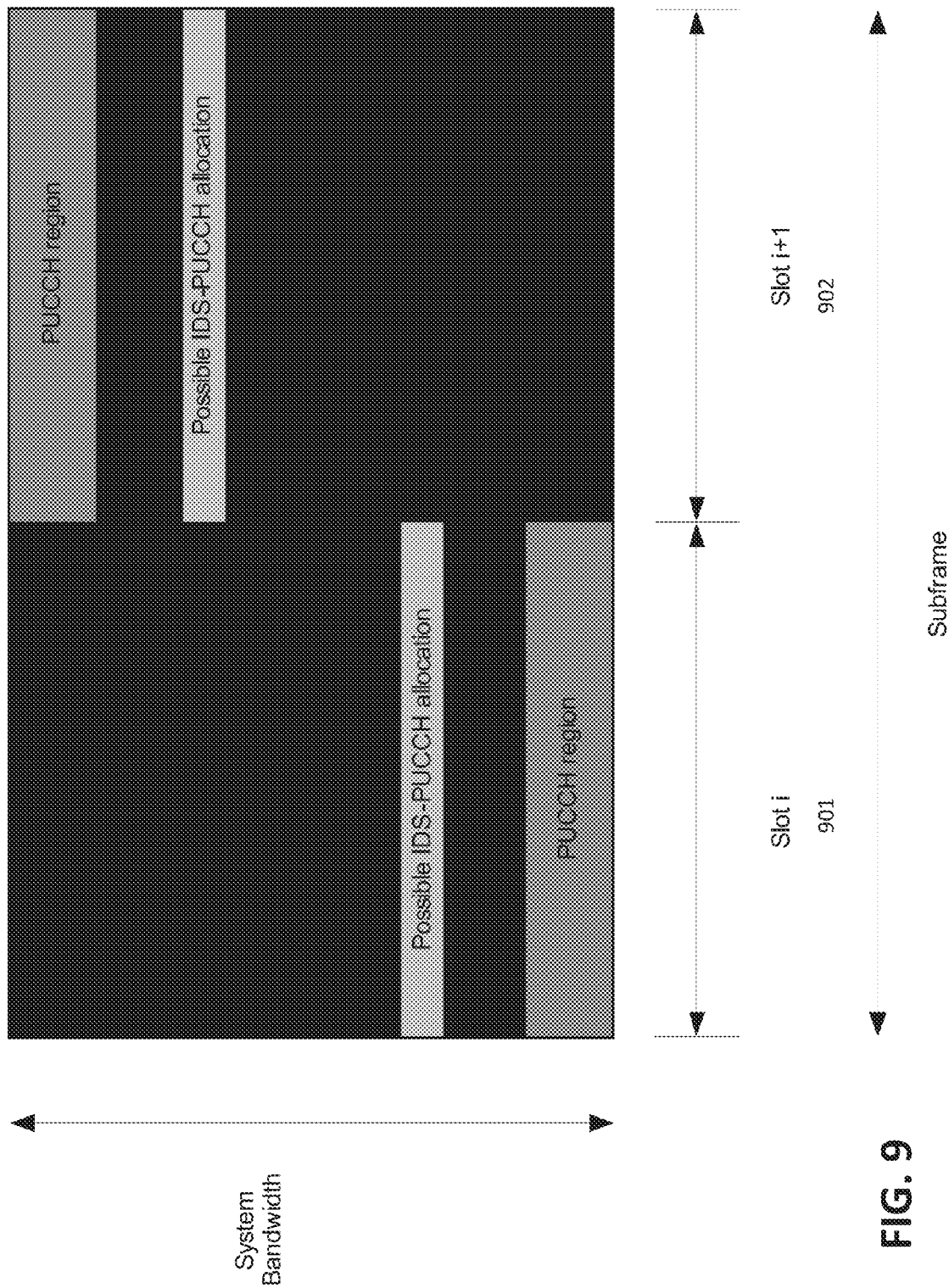
FIG. 9 is a graphical diagram showing the sub-band allocation of IDS resources for an inter-device session physical uplink control channel.

In a particular embodiment shown in FIG. 9, the IDS-PUCCH may be defined within the PUSCH region and not at the band edges. FIG. 9 is a graphical diagram showing the sub-band allocation of resources for an inter-device session physical uplink control channel. This allocation is different from the normal LTE PUCCH location assignments. In this embodiment, the IDS PUCCH is located in the PUSCH region in order to provide RS for the other UE to measure in order to determine sub-band CQI estimates. The IDS-PUCCH (901 and 902) locations are assigned in pairs, with a different location per slot for slot i (901) and slot i+1 (902), as for PUCCH, with the exception that the locations are not at the band edges.

Either UE1 or UE2 or both of them send an IDS-PUCCH message to the eNB indicating CSI of the received SRS, or PUCCH RS or other reference signal from the other UE. From this feedback, the eNB determines whether it is feasible to start IDS resource allocations. Then, the eNB sends an allocation for IDS resources using a PDCCH DCI configured with the inter-device session (IDS) RNTI.

The ACK/NACK response can be sent using IDS-PUCCH resources as previously described. In some cases, the ACK/NACK response is sent via UE-specific assigned IDS-PUCCH, for example, in an LTE Format 2a or 2b (or format 2) type message. In other cases, the ACK/NACK response is sent via IDS-PUCCH resources, for example, in an LTE Format 1a or 1b type message. In cases where an LTE Format 1a or 1b type message is used, the specific IDS-PUCCH resources used for the transmission is derived from a mapping of the location of a resource used to send the DL control message to IDS-PUCCH resources.

In some embodiments, the resource allocation is "asynchronous HARQ" such that the PDCCH DCI allocates resources for a single IDS transmission; after an IDS transmission, UE1 receives an ACK/NACK response from UE2 corresponding to the IDS transmission according to the embodiments described herein. UE1 can interpret the ACK/NACK feedback on its own and determine to retransmit if necessary in the next IDS transmission to UE2. The next IDS transmission maybe allocated by another PDCCH DCI transmission, for example.

In some other embodiments, the resource allocation is "synchronous HARQ" such that the PDCCH message allocates resources for one or more periodic resources for an IDS packet transmission and potential retransmissions up to a maximum number of retransmissions; after an IDS transmission, UE1 receives an ACK/NACK response from UE2 corresponding to the IDS transmission according to the embodiments described herein and possibly a further PDCCH DCI corresponding to the IDS transmission from the eNB. If a PDCCH DCI corresponding to the IDS transmission is received, in a first embodiment of interpreting a further PDCCH DCI, UE1 can determine if a new packet transmissions or retransmission is scheduled from the New Data Indicator (NDI). A further embodiment of interpreting a further PDCCH DCI ignores the PDCCH DCI NDI information and proceeds according to ACK/NACK feedback from UE2. In either embodiment, the UE1 applies resources assignment or other information to the transmission as appropriate. If a PDCCH DCI corresponding to the IDS transmission is not received or the PDCCH DCI NDI is ignored, the UE can interpret the ACK/NACK feedback from the UE2 corresponding to the IDS transmission, and determine to retransmit if necessary in the next IDS transmission to UE2 according the synchronous HARQ assignment. If a NACK was received, then UE1 can retransmit the IDS transmission to UE2 according the synchronous HARQ assignment. If an ACK was received, then UE1 ceases transmission of this packet. In some embodiments, the eNB may also receive the ACK from UE2 and, therefore, determine that resources for further synchronous HARQ transmission of this packet are not needed and can be assigned otherwise.

The above mentioned process of allocation/transmission of HARQ ACK/NACK feedback along with periodic sounding may continue until the inter-device session is terminated or the IDS is otherwise reconfigured by the eNB.

Depending on the configuration assigned by the eNB, one or both of the UEs send reference signals as indicated by the eNB session setup commands. The reference signal may be specifically assigned for use in an IDS (i.e., an IDS-RS), or the RS may be an RS normally assigned to a UE for UE-eNB communications.

Either UE1 or UE2 or both send an IDS-PUCCH/PDSCH message to the eNB indicating CSI of the received (IDS-)RS from the other UE. In this example, the current receiver, UE2, may also send a scheduling request (SR) if UE2 has data that UE2 wishes to send to UE1.

Figure 6:
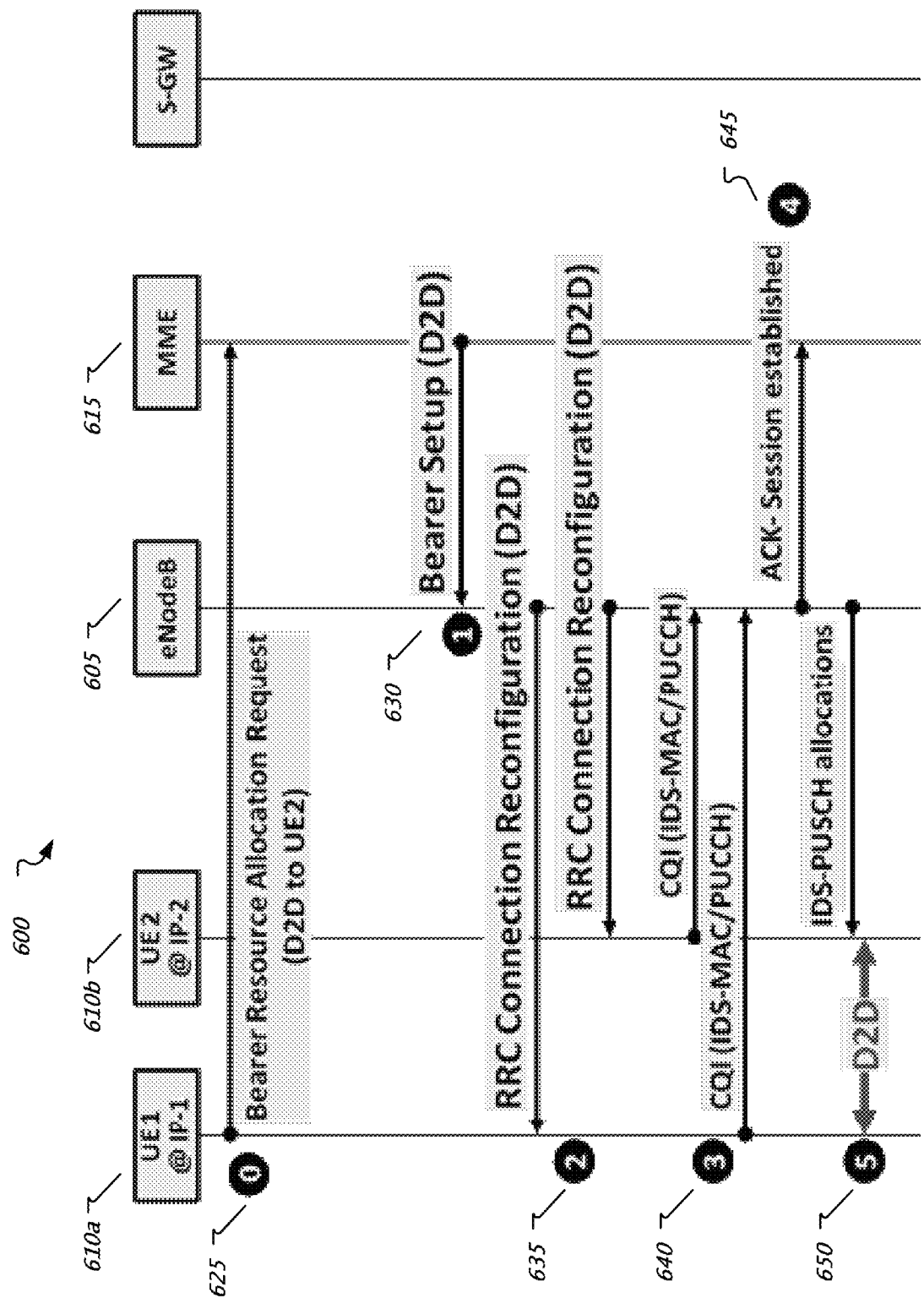
FIG. 6 is a message sequence diagram illustrating an example network operation for an inter-device session.

FIG. 6 is a message sequence diagram 600 illustrating an example network operation for an inter-device session. In this packet oriented UE-initiated mechanism 600, a first UE 610a (UE1) initiates a device-to-device setup to a second UE 610b (UE2) by sending a bearer resource allocation request to the network (625). The network can chose to ignore or grant this request based on device and network capabilities, as well as policies and traffic loading. If allowed, Mobility Management Entity (MME 615) sends a request to eNB 605 to initiate a device-to-device radio bearer connection between UE1 and UE2 (630). eNB 605 can provide IDS-RNTI and other setup information, and instructs UE1 and UE2 to report CQI received from the other UE's RS/PUCCH/IDS-PUCCH signals (635). UE1 and UE2 report received channel conditions (e.g., CQI) of the device-to-device channel to eNB 605 (640). If device-to-device channel conditions are sufficient to establish a session, eNB 605 propagates successful "ACK" to the MME (645). The eNB 605 allocates PUSCH/PDSCH resources using IDS-RNTI encoded grants in PDCCH so that packet exchange between UE1 and UE2 now occurs over the device-to-device connection, bypassing the network infrastructure (650), as described in FIG. 5.

Figure 7:
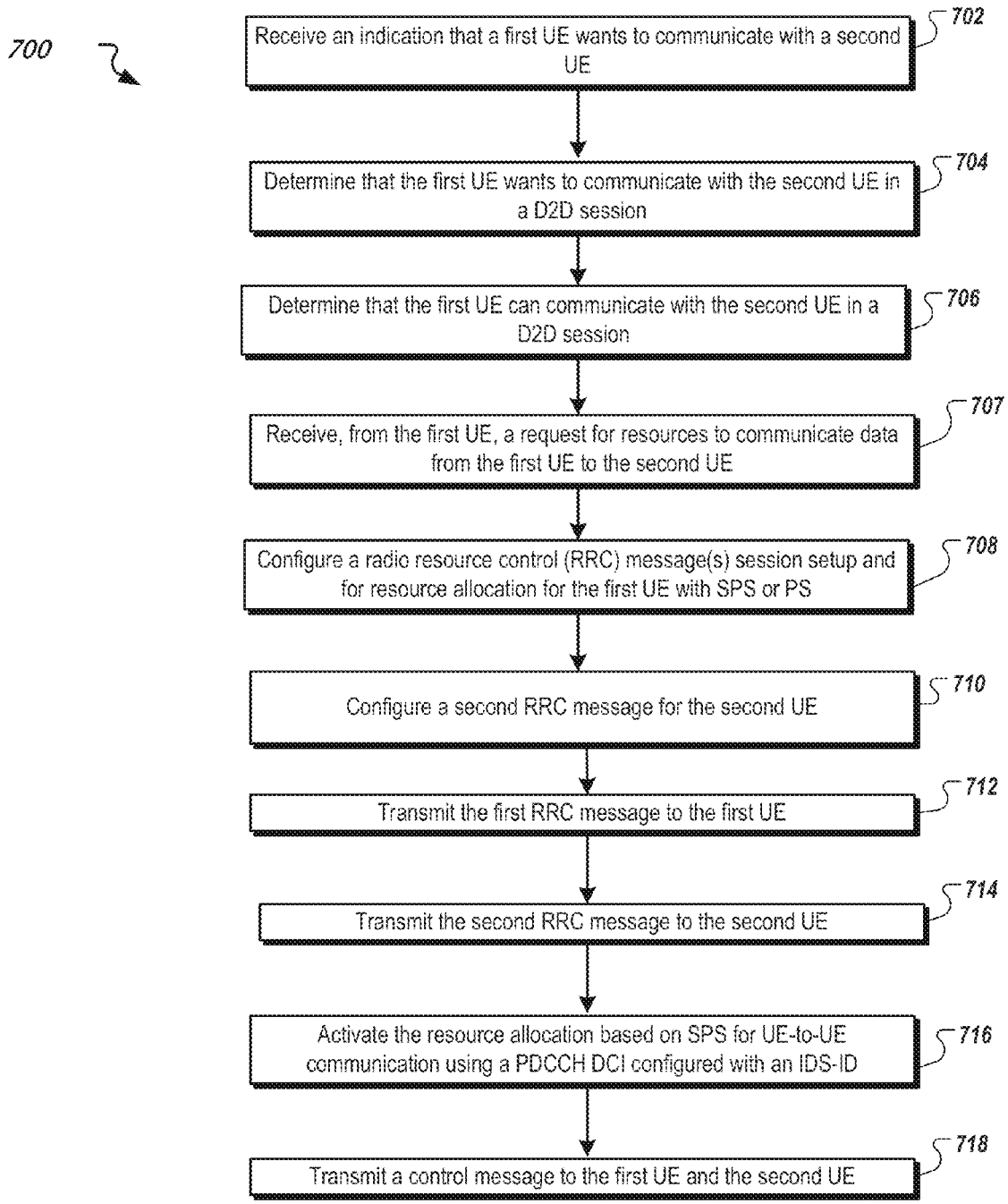
FIG. 7 is a flow chart illustrating an example process of IDS communications performed by a network node.

FIG. 7 is a flow chart 700 illustrating an example process of inter-device session communications that may be performed by a network node of a mobile communications network. The network node may be an evolved Node B (eNB) of a communications network, such as a long term evolution (LTE) network, or another network node, described above. The network node can receive an indication (702) that a first UE (UE1) wants to communicate with a second UE (UE2). This indication can be a received data packet addressed to the second UE, or the indication can be a request for resources. The indication can also include a request or indication that UE1 wants to communicate with UE2 in an inter-device session (704). In certain instances, the network node can determine (706) that an inter-device session may be possible between UE1 and UE2. The network node can make this determination based on known information about UE1 and UE2, such as whether the UEs are in the same cell. The network node can also base this determination on network loads and channel conditions—information that is known or that can be discovered through feedback received from the UEs (discussed more below). The network node can also determine, without an explicit request from the UEs, that an inter-device session can occur and can initiate an inter-device session without a request from the UEs. In short, the UE or the network node can initiate the inter-device session.

In certain instances, the network node can receive a request (e.g., from UE1) for resources to communicate data from UE1 to UE2 (707). The network node can use the request for resources to initiate an inter-device session between UE1 and UE2. Such an initiation can be executed based on a number of other factors, including those listed above.

In some embodiments, after the network node has determined that the network will initiate an inter-device session, the network node can configure a first radio resource control RRC message for UE1 (708). The network node can also configure a second IDS-PUCCH message for UE2 (710). The message can configure resources for the UEs to transmit and/or receive data in an inter-device session. For example, the message may contain information related to the IDS-SPS allocation including a resources assignment and an IDS-SPS-RNTI. In another example, the message may contain information related to an IDS-PS allocation including a resources assignment. The message may also contain the resources and configuration of feedback information directly between the UEs.

With the first RRC message, or in separate RRC messages, the network node may transmit to UE1 UE1-configuration information for an inter-device session (IDS) between UE1 and UE2 (712). The UE1 configuration information can include a radio network identifier. Similarly, configuration information can be sent to UE2 (714). This configuration information may include configuration information used by UE2 to measure signals from UE1. The network node can transmit to UE1 UE1-configuration information for an inter-device session (IDS) between UE1 and UE2 (714). The UE1 configuration information can include a radio network identifier. Similarly, configuration information can be sent to UE2 and used by UE2 to measure signals from UE1 (716). Put differently, the network node can transmit a setup message to UE1. The set-up message can include an IDS-physical uplink control channel (IDS-PUCCH), a radio network identifier, such as an IDS-radio network temporary identifier (IDS-RNTI), an IDS-an RxCCH configuration, an IDS-TxCCH configuration, etc. In certain implementations, configuration information can be used by UE1 to measure signals from UE2 for feedback purposes, such as channel state indicators, rank indicators, precoding matrix indicators, etc., from physical uplink control channel (PUCCH), reference signal (RS), etc.

The network node can also transmit a control message that is configured with the radio network identifier and identifies a radio resource or previously configured resources assignment for the IDS, such that UE1 is permitted to transmit data directly to UE2 via the radio resource (718). For example, in the case of IDS-SPS assignment, the network node may transmit an activation of the IDS-SPS resources that were configured by RRC message(s), the activation by PDCCH DCI configured with the IDS-SPS-RNTI or IDS-RNTI of the session as described in the embodiments.

Figure 10:
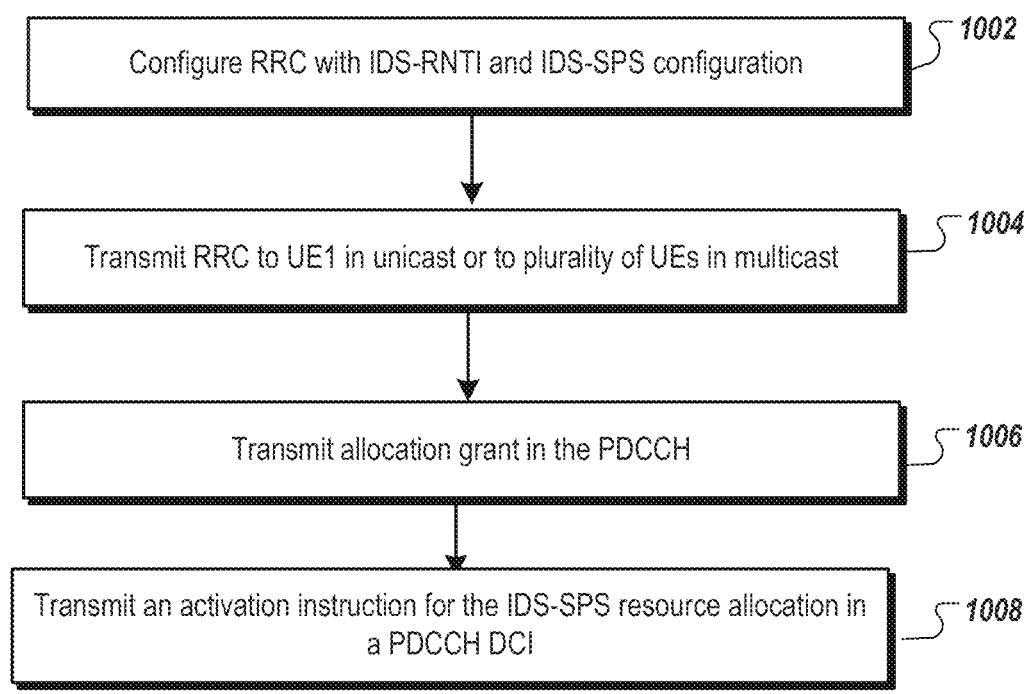
FIG. 10 is a process flow diagram illustrating an example of resource allocation.

FIG. 10 is a process flow diagram 1000 for transmitting IDS-SPS/IDS-PS resource allocation. A radio resource control (RRC) message can be configured with an IDS-RNTI and an IDS-SPS/IDS-PS resource allocation scheme (1002). The RRC message can be transmitted to UE1 in a unicast message or to multiple UEs in a multicast (1004). In the case of transmitting the RRC message to UE1 in a unicast message, the RRC message can be transmitted to other UEs of the IDS in separate unicast messages (1006). At a later time, the resource allocation grant can be transmitted to the UE(s) using a Downlink Control Information (DCI) in the PDCCH (1008). The DCI is for IDS-SPS activation. In the case of IDS-PS allocation, further activation messages are not needed at the start time may be derived or indicated in the RRC message(s).

In certain implementations, UE1 configuration information (as described in the example of FIG. 7, for example) can be transmitted in a radio resource control (RRC) message. The control message can be transmitted via a downlink shared channel, such as a physical downlink shared channel (PDSCH).

The network node may transmit, to UE2, UE2 configuration information for the IDS between UE1 and UE2. UE2 configuration information may include the same radio network identifier as UE1. In some implementations, the radio network identifier is an inter-device session radio network temporary identifier (IDS-RNTI).

In some implementations, the UE1 configuration information further includes a session UE1-identifier (UE1-ID), and the UE2 configuration information further includes a session UE2-identifier (UE2-ID), the UE1-ID being different from the UE2-ID. The control message that includes an allocation of the radio resource for the IDS further includes the radio network identifier and an indication of either the UE1-ID or the UE2-ID. Transmitting the control message may also include or involve transmitting the control message to UE1 and UE2. The control message indicates that UE1 is to transmit and UE2 is to receive if the control message indicates the UE1-ID, and the control message indicates that UE2 is to transmit and UE1 is to receive if the control message indicates the UE2-ID.

For the same radio network identifier, the UE1 configuration information indicates that UE1 is a transmitter, and the UE2 configuration information indicates that UE2 is a receiver. The UE1 configuration information can be a first UE1 configuration information, and the UE2 configuration information can be a first UE2 configuration information. The radio network identifier included in the first UE1 configuration information and the first UE2 configuration information can be a first radio network identifier. In certain instances, the network node can transmit a second UE1 configuration information to UE1. The network node can also transmit a second UE2 configuration information to UE2. The second UE1 configuration information and the second UE2 configuration information include a second radio network identifier. The second radio network identifier is different from the first radio network identifier and indicates that, for the second radio network identifier, UE1 is a receiver and UE2 is a transmitter.

In certain aspects of the implementations, the radio network identifier included in the UE1 configuration information is a first radio network identifier, and the UE2 configuration information includes a second radio network identifier. The first radio network identifier may be a first IDS radio network temporary identifier (IDS-RNTI-UE1), and the second radio network identifier maybe a second IDS radio network temporary identifier (IDS-RNTI-UE2).

In certain implementations, the network node may transmit, to UE1, a transmit power control radio network identifier for power control commands associated with the IDS. The transmit power control radio network identifier can be included in UE1 configuration information. The network node may transmit at least one power control command configured with the transmit power control radio network identifier, the power control command controlling the transmit power for transmissions between UE1 and UE2. The power control command can be configured to adjust transmit power of a reference signal transmitted by UE1 and received by UE2 for channel state information measurement. The transmit power control radio network identifier maybe a Radio Network Temporary Identifier (RNTI).

In some instances, more than two UEs can be involved in the inter-device session. For example, the network node can transmit, to a third UE (UE3), UE3 configuration information for the IDS among UE1, UE2, and UE3.

Figure 8:
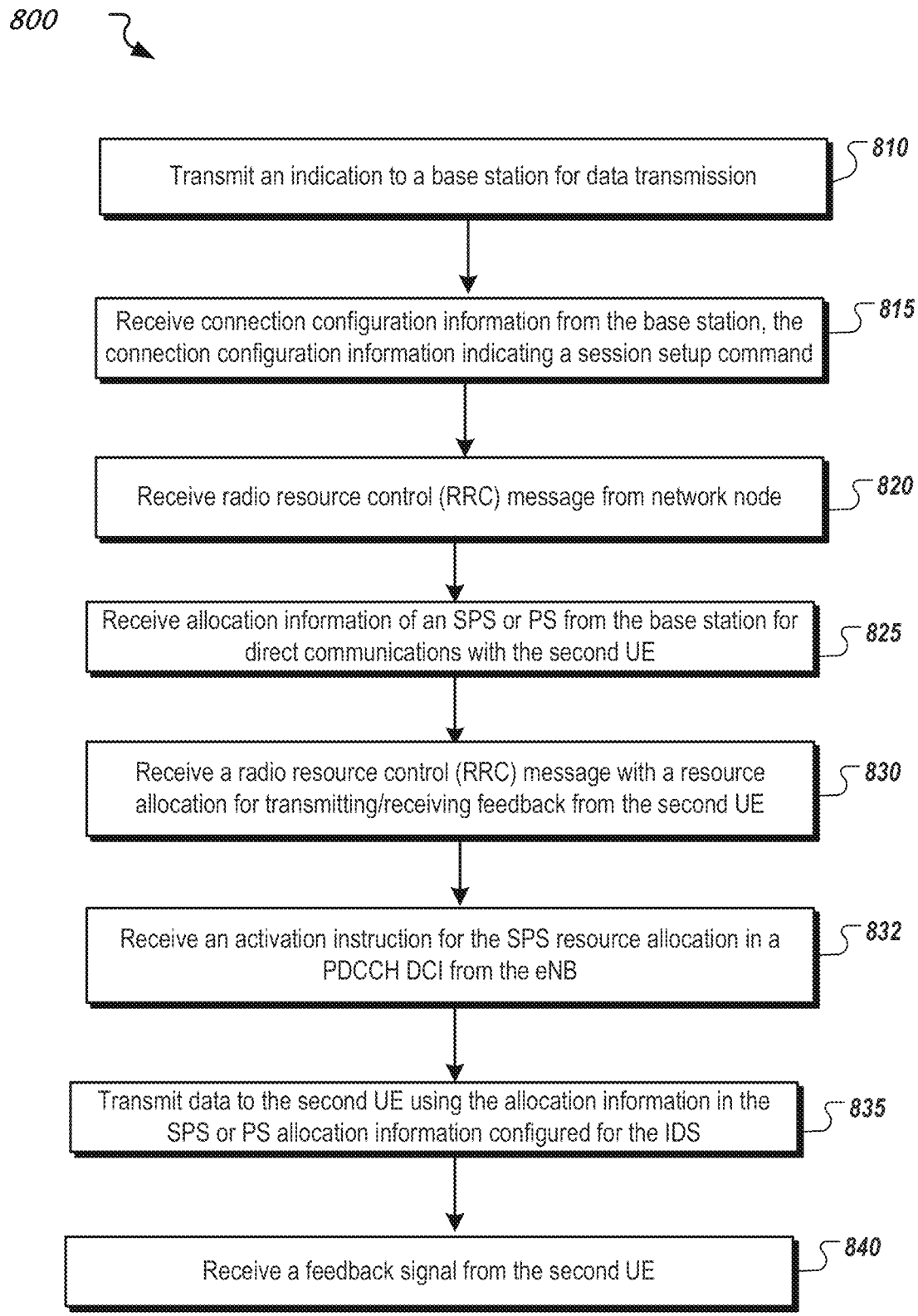
FIG. 8 is a flow chart illustrating an example process of IDS communications performed by a user equipment.

FIG. 8 is a flow chart 800 illustrating an example process of inter-device session communications that may be performed by a user equipment (UE) operating in a wireless communications network. The UE (UE1) may be a cellular handset, such as a cellular phone or smartphone, or may be a tablet PC, or may be any other user equipment that can communicate with other user equipment in a wireless communications network, such as a long term evolution (LTE) network. UE1 can transmit an indication that UE1 wants to communicate with a second UE (UE2) (810). This indication can be a data packet addressed to the second UE, or the indication can be a request for resources. The indication can also include a request or indication that UE1 wants to communicate with UE2 in an inter-device session. In certain instance, the network node can determine that an inter-device session can occur between UE1 and UE2.

UE1 can receive from the network node UE1-configuration information for an inter-device session (IDS) between UE1 and UE2 (815). The UE1 configuration information can include a radio network identifier. UE1 can also receive a radio resource control (RRC) message from the network node (820). UE1 can also receive a resource allocation for transmitting/receiving feedback from UE2 (830). Put differently, UE1 can receive a set-up message or messages from the network node. The set-up message can include an IDS-physical uplink control channel (IDS-PUCCH), a radio network identifier, such as an IDS-radio network temporary identifier (IDS-RNTI), an IDS-RxCCH configuration, and IDS-TxCCH, etc. In certain implementations, configuration information can be used by UE1 to measure signals from UE2, such as physical uplink control channel (PUCCH), reference signal (RS), ACK/NACK feedback, channel state indicators, rank indicators, precoding matrix indicators, etc. Such signals can be used for feedback purposes, and ACK/NACK information can be used to determine whether or not further HARQ transmission is needed. Similarly, configuration information can be sent to UE2 and used by UE2 to measure signals from UE1. UE1 can also receive (e.g., with the RRC message) an identification of a radio resource for the IDS, such that UE1 is permitted to transmit data directly to UE2 via the radio resource (825), in some cases including a radio network identifier (e.g. IDS-RNTI, and/or IDS-SPS-RNTI).

UE1 can also receive an activation instruction from the network node (832) in the case of IDS-SPS allocation. The activation can be sent by PDCCH DCI from the eNB configured with the IDS-RNTI or the session, or alternatively, the IDS-SPS-RNTI of the IDS-SPS configuration as discussed in the embodiments. In the case of IDS-PS allocation, activation messages are not needed as the start time may be derived or indicated in the RRC message(s) or configuration. UE1 can send data to UE2 using the allocation information (835) received for the IDS-SPS or IDS-PS allocation. UE1 can receive feedback information or a feedback signal from UE2 (840).

In certain implementations, UE1 configuration information can be received in a radio resource control (RRC) message. The control message can be received via a downlink control channel, such as a physical downlink control channel (PDCCH) or enhanced physical downlink control channel (ePDCCH). The control message can be received in a Downlink Control Information (DCI) element of the downlink control channel.

A first reference signal can be configured for UE1. Configuration information including the first reference signal configuration can be provided to UE2, e.g., in a radio resource control (RRC) message. The first reference signal configuration can identify a reference signal (RS) resource. The first reference signal configuration may be associated with a physical uplink control channel configuration. The physical uplink control channel configuration is an IDS-specific physical control channel configuration for an inter-device session between UE1 and UE2.

The reference signal configuration identifies a reference signal for UE2 to monitor from UE1, and can also identify a reference signal resource for the inter-device session. The reference signal can be used by UE2 to determine a channel state between UE1 and UE2. The reference signal can also be used by UE2 to determine timing alignment for the inter-device session. The network node can receive channel state indicator (CSI) from UE2. For example, the network node can receive a channel state indicator on an IDS-specific physical uplink control channel. The channel state indicator can indicate a channel state between UE1 and UE2 . The channel state indicator can be received from UE2 via an IDS-specific physical uplink control channel. The channel state indicator can include one or more of a channel quality indicator (CQI), precoding matrix index (PMI), rank indicator (RI), or precoding type indicator (PTI). The CSI can report a channel state of a direct radio channel from UE1 to UE2.

UE1 can provide feedback to the network node, from which the network node can determine whether the IDS has been established. For example, the network node can determine, based on the channel state indicator received from UE1 or UE2, that the IDS has been established.

In certain implementations, transmission timing for the IDS radio resource can be based on a timing alignment for an uplink resource from UE1 to the network node.

UE1 can receive an indication of the feedback received from UE2. The indication of the feedback may be sent using IDS resources, where UE1 has been configured to derive the location and receive at least ACK/NACK HARQ feedback to IDS transmissions. The indication of the feedback may be sent using IDS-PUCCH resources. The IDS-PUCCH resources may be different from an uplink transmission resource for acknowledgement/negative acknowledgement (ACK/NACK) feedback for eNB to UE downlink transmissions.

In certain aspects of the implementations, the radio resource for the inter-device session may include one of LTE physical uplink shared channel (PUSCH) resources or LTE physical downlink shared channel (PDSCH) resources.

The network node may transmit, to UE2, UE2 configuration information for the IDS between UE1 and UE2. UE2 configuration information may include the same radio network identifier as UE1. In some implementations, the radio network identifier is an inter-device session radio network temporary identifier (IDS-RNTI).

In some implementations, the UE1 configuration information further includes a session UE1-identifier (UE1-ID), and the UE2 configuration information further includes a session UE2-identifier (UE2-ID), the UE1-ID being different from the UE2-ID. The control message that includes an allocation of the radio resource for the IDS further includes the radio network identifier and an indication of either the UE1-ID or the UE2-ID. Transmitting the control message may also include or involve transmitting the control message to the UE1 and UE2. The control message indicates that UE1 is to transmit and UE2 is to receive if the control message indicates the UE1-ID, and the control message indicates that UE2 is to transmit and UE1 is to receive if the control message indicates the UE2-ID.

In implementations where a single radio network identifier is used, the UE1 configuration information can indicate that the UE1 is a transmitter, and the UE2 configuration information indicates that UE2 is a receiver. The UE1 configuration information can be a first UE1 configuration information, and the UE2 configuration information can be a first UE2 configuration information. The radio network identifier included in the first UE1 configuration information and the first UE2 configuration information can be a first radio network identifier. In certain instances, the network node can transmit a second UE1 configuration information to UE1. The network node can also transmit a second UE2 configuration information to UE2. The second UE1 configuration information and the second UE2 configuration information include a second radio network identifier, the second radio network identifier different from the first radio network identifier and indicates that, for the second radio network identifier, UE1 is a receiver and UE2 is a transmitter.

While several implementations have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

While the above detailed description has shown, described, and pointed out the fundamental novel features of the disclosure as applied to various implementations, it will be understood that various omissions and substitutions and changes in the form and details of the system illustrated may be made by those skilled in the art, without departing from the intent of the disclosure. In addition, the order of method steps not implied by the order they appear in the claims.

What is claimed is:

1. A method performed by a network node of a wireless communications network, the method comprising:
receiving, from a first user equipment (UE), a request to perform an inter-device session (IDS) between the first UE and a second UE;
determining by the network node that the first UE can perform the IDS based on subscription information of the first UE;
transmitting, to the first UE, configuration information for the first UE (UE1 configuration information) to perform the IDS, the UE1 configuration information including information for configuring the IDS and a first IDS radio network temporary identifier (IDS-RNTI) assigned for indicating, by the network node, a resource allocation for the first UE to transmit data directly to the second UE; and
transmitting a first control message addressed to the first IDS-RNTI, the message including radio resource information indicating a first radio resource for the first UE to transmit the data directly to the second UE and radio resource information indicating a second radio resource for the first UE to transmit one or more transmission parameters directly to the second UE, wherein the first radio resource is different than the second radio resource, and the transmission parameters include modulation and coding scheme of the direct data transmission.

2. The method of claim 1, further comprising:
transmitting, to the second UE, configuration information for the second UE (UE2 configuration information) for the inter-device session (IDS) between the first UE and the second UE, the UE2 configuration information including a second IDS radio network temporary identifier (IDS-RNTI); and
transmitting a second control message to the second UE indicating the resource allocation for the first UE to communicate directly with the second UE.

3. The method of claim 2, further comprising transmitting the first control message to the first UE and the second control message to the second UE separately.

4. The method of claim 3, wherein the first control message and the second control message are the same.

5. The method of claim 1, further comprising:
repeatedly transmitting the content of the first and second control messages to the first UE and the second UE; and
wherein the configuration includes an instruction instructing one or both of the first UE and the second UE to refrain from transmitting acknowledgement/negative acknowledgement (ACK/NACK) messages in response to IDS transmissions.

6. The method of claim 1, wherein the resource allocation identifies a resource for hybrid automatic repeat request (HARQ) transmissions.

7. The method of claim 6, wherein the resource allocation identifies a resource for a first HARQ transmission, and the method further comprises identifying resources for subsequent HARQ retransmissions.

8. The method of claim 1, further comprising:
transmitting, to the second UE, an indication of an IDS-physical uplink control channel (IDS-PUCCH) of the first UE, the IDS-PUCCH identifying a resource on which to transmit an acknowledgment/negative acknowledgement (ACK/NACK) indicator; and
instructing the first UE to receive the ACK/NACK indicator from the second UE.

9. The method of claim 1, wherein the first UE and the second UE are configured to not transmit acknowledgement/negative acknowledgement (ACK/NACK) messages in response to IDS transmissions; and wherein a maximum number of transmissions is configured and known to the UEs.

10. The method of claim 1, wherein a modulation and coding scheme (MCS) of the IDS transmission is adjustable by the first UE.

11. The method of claim 10, wherein the MCS change or a new MCS is indicated by the first UE via an inter-device session-medium access control (MAC) control element (IDS-MAC CE), the IDS-MAC CE sent over direct device-to-device resources.

12. The method of claim 1, wherein an IDS transmission power level of the IDS transmission is adjustable by the first UE.

13. The method of claim 12, wherein the IDS transmission power level change or a new IDS transmission power level is indicated by the first UE via an IDS-MAC CE, the IDS-MAC CE sent over direct device-to-device resources.

14. The method of claim 1, wherein the transmission on the resources allocation is scrambled by one of the IDS-RNTI of the UE-to-UE session, the inter device session semi persistent scheduling radio network temporary identifier (IDS-SPS RNTI), or inter device session persistent scheduling radio network temporary identifier (IDS-PS RNTI), as configured by the radio resource control (RRC) allocation.

15. The method of claim 1, wherein the resource allocation identifies a resource for the first HARQ transmission.

16. The method of claim 15, further comprising configuring resources for ACK/NACK transmission from the second UE in response to IDS transmissions; and allocating IDS resources for re-transmissions according to the ACK/NACK feedback.

17. The method of claim 1, further comprising transmitting, to the first UE and the second UE, the configuration of an IDS receiver control channel (IDS-RxCCH), the IDS-RxCCH configuration identifying a resource on which to transmit feedback directly from the second UE to the first UE.

18. The method of claim 17, wherein the IDS-RxCCH is usable by the second UE to instruct the first UE to adjust an IDS transmission power level of a UE-to-UE transmission.

19. The method of claim 17, wherein the IDS-RxCCH is usable by the second UE to send IDS CQI information to the first UE.

20. The method of claim 17, wherein the IDS-RxCCH is usable by the second UE to send ACK/NACK indications to the first UE.

21. The method of claim 17, wherein the IDS-RxCCH is usable by the second UE to send a request for a transmission opportunity to the first UE.

22. The method of claim 1, further comprising transmitting, to the first UE and the second UE, the configuration of an IDS transmitter control channel (IDS-TxCCH), the IDS-TxCCH configuration identifying a resource on which to transmit control information directly from the first UE to the second UE.

23. The method of claim 22, wherein the IDS-TxCCH is usable by the first UE to indicate a change in the modulation and coding scheme (MCS) of a UE-to-UE transmission.

24. The method of claim 23, wherein the IDS-TxCCH is usable by the first UE to indicate a change in transmission parameters of a UE-to-UE transmission.

25. The method of claim 1, wherein a modulation and coding scheme (MCS) of the IDS transmission is configured by the network node.

* * * * *